March 21, 1967 D. V. RYER 3,310,658

RELEVANT DATA READOUT APPARATUS

Filed July 8, 1963 9 Sheets-Sheet 1

INVENTOR.
DAMOND V. RYER

BY Fred Jacob

ATTORNEY

March 21, 1967 D. V. RYER 3,310,658

RELEVANT DATA READOUT APPARATUS

Filed July 8, 1963 9 Sheets-Sheet 2

INVENTOR.
DAMOND V. RYER

BY Fred Jacob

ATTORNEY

RELEVANT DATA READOUT APPARATUS

INVENTOR.
DAMOND V. RYER

BY Fred Jacob

ATTORNEY

INVENTOR.
DAMOND V. RYER
BY Fred Jacob
ATTORNEY

March 21, 1967 D. V. RYER 3,310,658

RELEVANT DATA READOUT APPARATUS

Filed July 8, 1963 9 Sheets-Sheet 5

INVENTOR.
DAMOND V. RYER
BY Fred Jacob
ATTORNEY

RELEVANT DATA READOUT APPARATUS

INVENTOR.
DAMOND V. RYER
BY
Fred Jacob
ATTORNEY

INVENTOR.
DAMOND V. RYER
BY Fred Jacob
ATTORNEY

RELEVANT DATA READOUT APPARATUS

Filed July 8, 1963 9 Sheets-Sheet 8

INVENTOR.
DAMOND V. RYER
BY
[signature]
ATTORNEY

INVENTOR.
DAMOND V. RYER

BY

Fred Jacob

ATTORNEY

United States Patent Office 3,310,658
Patented Mar. 21, 1967

3,310,658

RELEVANT DATA READOUT APPARATUS

Damond V. Ryer, Cambridge, Mass., assignor to Honeywell Inc., a corporation of Delaware

Filed July 8, 1963, Ser. No. 293,351
30 Claims. (Cl. 235—61.11)

The present invention relates in general to new and improved readout apparatus and in particular to apparatus for recovering encoded information from a storage medium.

The term "returnable media" is applied to storage media which, after having served their primary function, can be returned for automatic processing without the necessity of transcribing the information appearing thereon. Common examples of returnable media are punched cards, magnetic ink imprinted checks, stubs attached to bills, certain coupons, etc. All of these storage media carry information for use by the original recipient and all may be returned for machine processing without further human intervention.

A problem shared by all returnable media documents is the defacing and obliteration of relevant document information, or the destruction of pertinent document portions by folding, tearing, etc. Where this occurs, it may result in the partial or total loss of the information and will, at the very least, affect the reliability of readout. The importance of reliable readout is enhanced in the case of coupons where the coupon itself has a redemption value. These coupons are frequently enclosed in the same package as the merchandise and they may be crumpled, smudged or stained even before handling by the customer. In addition to information relating to its value, the coupon usually carries marketing information, e.g., information indicative of the nature of the article with which it was enclosed, its size, its packaging, where it was bought, etc.

As a rule, large numbers of returned documents must be processed and such processing must therefore proceed reliably and quickly. The readout apparatus must be able to distinguish relevant from non-relevant information, the latter usually taking the form of advertising in the case of redeemable coupons, and must further be able to read out the relevant information correctly despite marks, stains, defacing, etc. Where a digital code is employed, a proper time reference during readout is of the utmost importance, not only to discriminate against extraneous markings, but also so that the information, when read out, may be properly interpreted. Provision must be made to start and maintain this time reference for each document despite the possibility of extensive smudging or obliteration of the document and despite the destruction of entire document portions. Moreover, the readout apparatus must be capable of interpreting the extracted information even if the latter is only partially readable. Where erroneous information is read out, it is necessary that it be recognized at the time of readout so that it can be properly identified when stored with correctly read information.

Heretofore available equipment for reading out storage media of this kind was subject to the aforementioned problems to an extent where the reliability of document readout, particularly at high speeds, was questionable. It is the primary object of the present invention to provide readout apparatus which overcomes the foregoing disadvantages.

It is anothher object of the present invention to provide apparatus for reliably reading out documents at high speeds.

It is a further object of the present invention to provide apparatus for reading out documents wherein an accurate time reference is initiated and maintained even if portions of the document are not readable.

It is an additional object of the present invention to provide a document reader which can distinguish between relevant and non-relevant information and wherein proper readout occurs even though portions of the relevant information may be missing or not readable.

It is still another object of the present invention to provide a document reader which is capable of recognizing incorrectly readout information as erroneous and of appropriately indicating the same.

The invention which constitutes the subject matter of the present application is directed to a system for reading out data stored in binary digital form in a storage medium. A time reference circuit is provided wherein clock pulses are derived in response to the occurrence of transitions of the stored binary digital information. Once the clock pulses have been initiated by the recognition of a start mark on the medium, successive clock pulses are slaved to each other and can be generated only in a predetermined time relationship. Upon the failure of the circuit to generate a clock pulse, e.g., due to the obliteration of the information on the tracks, substitute clock pulses are produced which permit continuity of readout. Similarly, when the aforesaid start mark is not recognized, e.g., due to track obliteration, the circuit is capable of initiating the generation of clock pulses from a different set of criteria. The clock pulses are employed to decode the read out information, the invention further providing means for recognizing incorrectly read information and appropriately indicating such errors at the time of their occurrence.

Although the invention is applicable to different kinds of data storage media, it will be explained and illustrated with respect to a document reader for optically reading out relevant information which is printed in a di-bit bar code in a pair of tracks on the document, which are spaced from extraneous document information by means of a guard band. A document of this kind is disclosed in a copending application by Walter H. Gray et al., entitled, "Information-Bearing Document," Ser. No. 259,027, filed Feb. 18, 1963, which is assigned to the assignee of the present application.

These and other novel features of the invention together with further objects and advantages thereof will become apparent from the following detailed specification with reference to the accompanying drawings in which:

FIGURE 1 illustrates the optical and mechanical features of a preferred document readout station;

FIGURES 2A, B, C illustrates different portions of relevant document information;

*Scanner*

Figure 1:
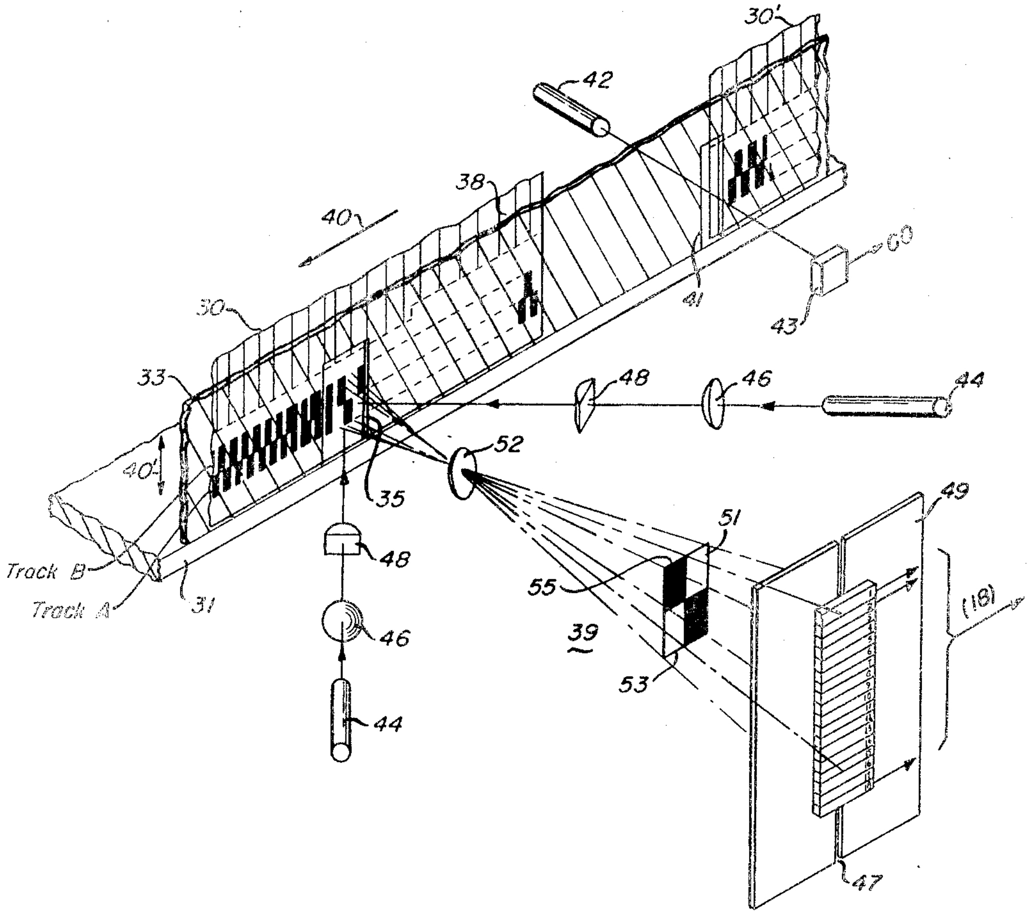

In addition to the scanning station 39, FIGURE 1 shows a document transport wherein the document or coupon 30 is positioned behind an opaque shield 33 and is moved along a deck 31 in the direction of the single-ended arrow 40, past an opening 35 in the shield 33. The shield is shown transparent only for the purpose of illustrating the coupon behind it. The relevant document information is contained in a pair of tracks which are designated as Track A and Track B respectively. The tracks are positioned adjacent to each other and a guard band establishes a predetermined minimum spacing from the nonrelevant document information 38.

The Track A and B are also spaced from the lower edge of the document which normally rides in contact with the deck 31, although variations of the last-mentioned spacing are possible due to faulty printing on the coupon or faulty cutting of the coupon following printing. Such variations, as well as any displacement of the document in a vertical direction away from the deck, will produce misregistration conditions in the direction of the double-ended arrow 40′ so that the track portion exposed under the opening 35 is displaced from a normally neutral position with respect to the scanning station 39. Apparatus for compensating for such misregistration is disclosed in a copending application by Albert A. Wyke et al., entitled Data Handling Apparatus, Ser. No. 293,455, filed July 8, 1963, which is assigned to the assignee of the present application.

The scanning station 39 includes a pair of light sources 44 each of which sends a light beam through a collimating lens system 46 and a condensing lens 48 to illuminate the document portion which is exposed under the opening 35 in the shield 33. The illuminated document image 51 is magnified and inverted by a receiving lens 52 and is thus projected onto a column of eighteen light-sensitive scanning cells. Each of the eighteen cells is adapted to provide a separate responsive output signal in accordance with the information scanned by it, as schematically indicated in the drawing by the designation 18.

The scanning cells are positioned behind a mask 49 whose vertical slit 47 admits only a narrow portion of the projected image 51. This increases the resolution of the over-all optical system for sensing the light reflected from the illuminated code track section. As a consequence, a desired squaring effect of the cell output signals is obtained, as will become clear hereinbelow. Since the image 51 inverts the illuminated document portion, the lower edge 53 actually represents the upper boundary of Track B, while the upper edge 55 corresponds to the lower boundary of Track A. In order to accommodate any misregistration in a vertical direction, as represented by the arrow 40′, the scanning cells preferably bracket the projected image so as to overlap its upper and lower edges.

FIGURE 1 further illustrates the arrival of the subsequent coupon 30′ as the leading edge of the latter moves into position behind a further opening 41 in the form of a slot in the shield 33. A light source 42 provides a light beam which reaches a light-sensitive photo transistor 43 through the slot 41. When the light beam is broken by the leading coupon edge, the photo transistor provides a responsive coupon pulse CO, as shown in the drawing.

*Document*

FIGURE 2 is divided into three parts, each of which illustrates in greater detail a different portion of representative di-bit bar code information which appears in Tracks A and B of the document 30. The direction of reading the document is assumed to be from left to right. The designations $t_a$, $t_b$, $t_c$, etc., on the time reference axis in each case indicate the beginning of a bit period, which is the time interval required for scanning a di-bit.

Figure 2C:
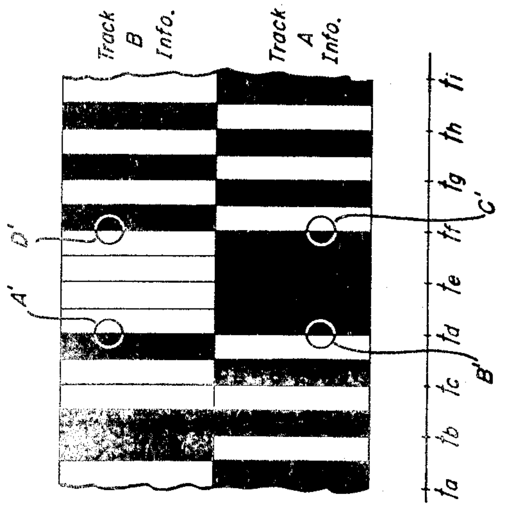
Figure 2B:
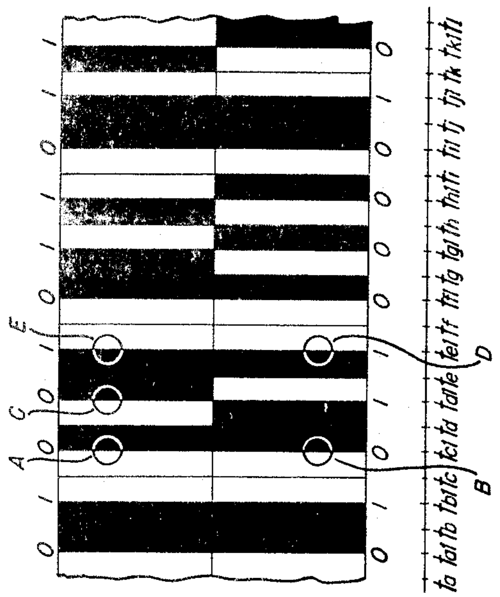
Figure 2A:
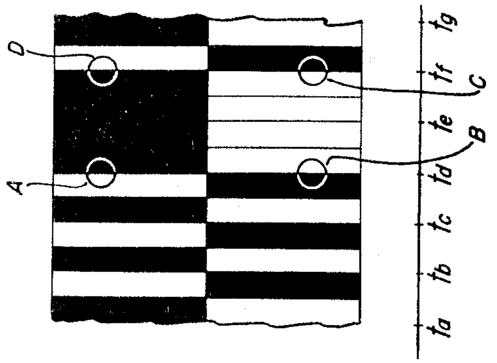

FIGURE 2A shows the initial coupon track portion which culminates in a "Sure Start" mark. It will be noted that between times $t_a$ and $t_d$, Tracks A and B show a pattern of complementing alternating black and white bars. This track section is referred to as the track leader and permits document registration information to be obtained prior to the start of the actual information. A "Sure Start" mark is represented between $t_d$ and $t_f$ which will be discussed in greater detail hereinbelow. For the present, it will be sufficient to state that the mark itself has no binary data significance, which is also true for the track leader.

Actual binary digital information is shown in FIGURE 2B, between times $t_a$ and $t_1$. The interpretation of each di-bit depends on the nature of the transition which occurs midway in each bit period. In accordance with the convention adopted herein, a transition from white to black, such as occurs in Tracks A and B at time $t_{a1}$, is representative of a binary ZERO. A transition from black to white, such as occurs in Track A time $t_{e1}$, is representative of a binary ONE. The representative binary digits are noted above and below the tracks and it will be seen that the information in Tracks A and B is not the same. It will also be seen that transitions occur at times other than midway in a bit period, e.g., at times $t_h$ and $t_k$ in Track B. Indeed, the document may be marked or defaced in such a manner as to make it appear to the scanning cells that transitions occur at other times as well. It is important therefore that proper clock signals be derived which will recognize only those transitions as valid which occur midway in a bit-period.

In FIGURE 2C a "Sure Stop" mark is indicated between times $t_d$ and $t_f$ in Tracks A and B and is seen to be the complement of the "Sure Start" mark that is shown between $t_d$ and $t_f$ in FIGURE 2A. Following the "Sure Stop" mark, a succession of complementing, alternating black and white bars again occurs until the end of the document is reached. As before, the latter marks have no binary data significance.

*Control circuit*

Figures 3, 5:
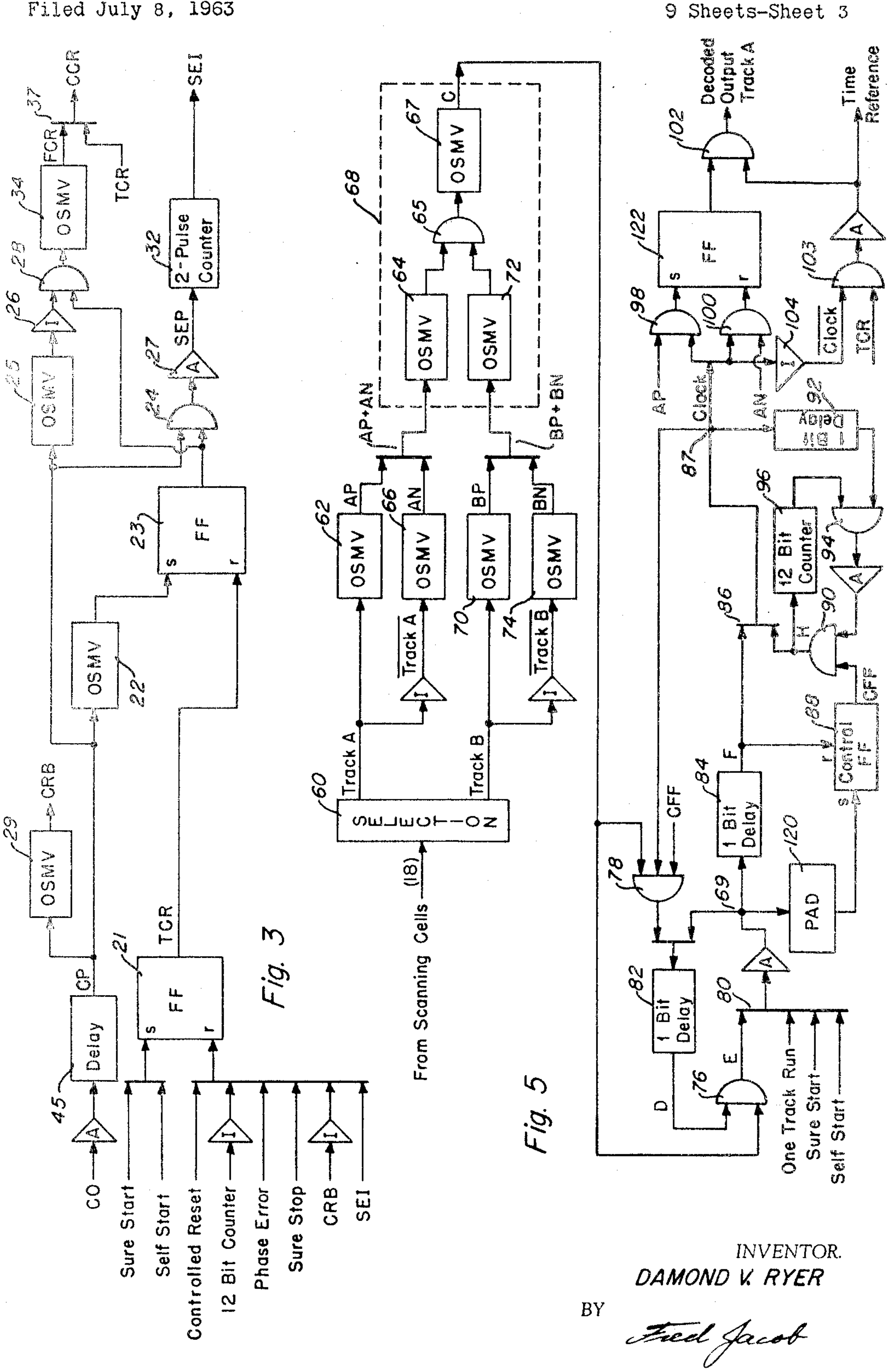
FIGURE 3 illustrates a circuit for providing certain control functions.
FIGURE 5 illustrates a preferred form of an information decoding circuit.

FIGURE 3 illustrates a circuit for deriving certain control signals which are necessary to the operation of the present system. The signal CO, which is derived from the phototransistor 43 in FIGURE 1, is amplified and then applied to a delay circuit 45. The latter may consist of a plurality of one-shot multivibrators so arranged as to provide a responsive negative "Coupon Present" pulse CP of predetermined duration a fixed time interval after the occurrence of the corresponding CO pulse. The "Coupon Present" pulse CP is coupled to a delay circuit in the form of a one-shot multivibrator 29 at the output of which a "Coupon Read Bracket" signal CRB is derived. The latter signal is present throughout the duration of the coupon and terminates only after the aforesaid "Sure Stop" mark of the coupon has passed the opening 35 in FIGURE 1. The coupon present signal CP is further coupled to a one-shot multivibrator 22 whose output in turn is connected to the set input of a flip-flop circuit 23.

The control circuit further includes a flip-flop circuit 21 having a set input to which a pair of signals designated "Sure Start" and "Self Start" respectively are buffered. The reset input of the flip-flop 21 similarly has a number of signals buffered thereto, as follows: A controlled reset signal which may be externally applied when it is desired to reset the flip-flop 21 upon command; the inverted output of a 12-bit counter which is further explained hereinbelow; a "Phase Error" signal; the "Sure Stop" signal; the inverted "Coupon Read Bracket" signal CRB, which is derived from the delay circuit 29; and a "Scanner Error Interlock" signal SEI. The derivation of the foregoing signals will be described in greater detail hereinbelow.

A "True Coupon Read" signal TCR is derived at the output of the flip-flop circuit 21 and is applied to the reset input of the flip-flop circuit 23. The output of the latter is connected to one input leg of a gate 28. A one-shot multivibrator 25 is connected to receive the Coupon Present signal CP, its own output being applied to an inverter 26. The latter is coupled to the other input leg of the gate 28. The output of the aforesaid gate 28 is connected to a one-shot multivibrator 34, the output signal of which is designated "False Coupon Read" or FCR and which is further applied to a buffer 37. The latter further receives the "True Coupon Read" signal TCR which is derived from the output of the flip-flop circuit 21. The signal output of the buffer 37 is designated "Combined Coupon Read" or CCR.

The "Coupon Present" signal CP is further applied to one input leg of a gate 24. The latter has its other input leg coupled to the output of the flip-flop circuit 23. The output of the gate 24 is applied to an amplifier 27 whose output sisgnal is designated SEP and is applied to a two-pulse counter 32. The aforesaid "Scanner Error Interlock" signal SEI is derived at the output of the counter 32.

The operation of the circuit of FIGURE 3 will now be explained with reference to the waveforms shown in FIGURE 4. The time reference divisions in FIGURE 4 pertain to successively scanned coupons which are arbitrarily designated A, B, C, D and E. Thus, when the leading edge of the first coupon (Coupon A) appears under the slot 41 in FIGURE 1 and breaks the light beam of the source 40 at time $T_A$, the level of the signal CO changes to zero. The zero signal level is retained until time $T_{A5}$ at which time the trailing coupon edge passes the slot 41 and light is again admitted to the phototransistor 43. The negative level of the signal is retained until time $T_B$ when the coupon B appears under the slot 41. The CP pulse which is derived from the negative-going transition of CO at time $T_A$, is delayed by a predetermined time interval sufficient to allow the coupon A to arrive at the opening 35 of the shield 33 in FIGURE 1. Thus, a coupon present pulse CP is provided each time a coupon is presented at the opening 35 for scanning.

Figure 4:
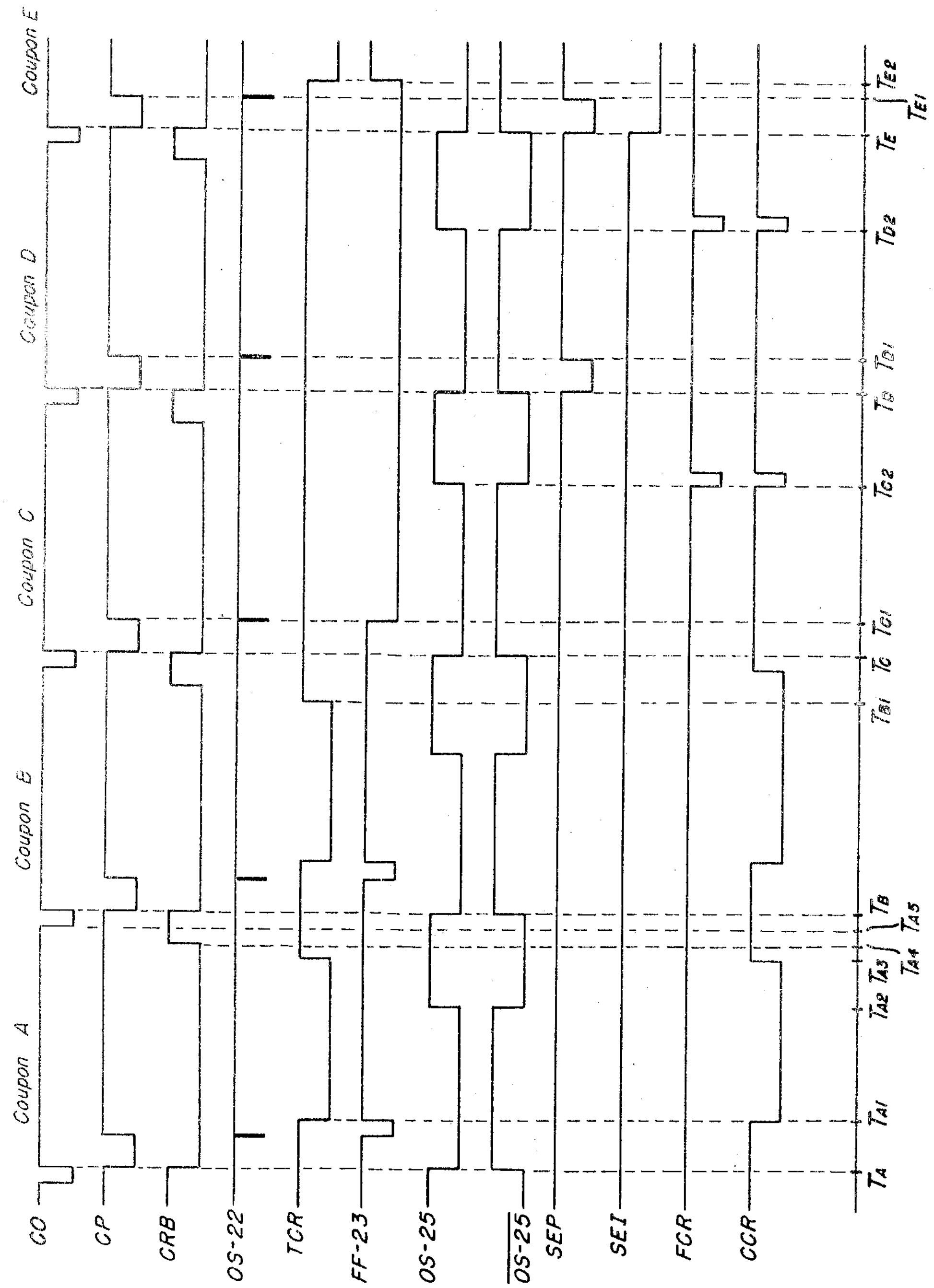
FIGURE 4 illustrates various waveforms which are applicable to the operation of the circuit of FIGURE 3.

The CP pulse is applied to the one-shot multivibrator 22 whose responsive output pulse OS–22, shown in FIGURE 4, sets the flip-flop 23. This is indicated by the negative-going pulse of the waveform FF–23. As will become clear from the explanation hereinbelow, if a properly imprinted coupon is present and the information tracks are legible so that they may be properly scanned, a "Sure Start" pulse is derived at time $T_{A1}$ which will set the flip-flop 21. This is indicated in FIGURE 4 for the responsive "True Coupon Read" signal TCR which is seen to become negative at time $T_{A1}$. The negative TCR signal operates to reset the flip-flop 23, as seen from the waveform FF–23.

The signal CP is further applied to the one-shot multivibrator 25 whose responsive output waveform and that of the subsequently connected inverter 26 are shown in FIGURE 4, designated OS–25 and $\overline{\text{OS–25}}$ respectively. The latter signals are seen to change levels at time $T_A$ in response to the leading negative edge of the CP pulse. Another signal level change occurs at time $T_{A2}$ in accordance with the period of the multivibrator 25. The signal $\overline{\text{OS–25}}$ is applied to the gate 28 jointly with the output signal derived from the flip-flop 23. Under the assumed operating conditions, the gate 28 remains non-conductive so that the "Combined Coupon Read" signal CCR is due entirely to the "True Coupon Read" signal TCR.

As shown in FIGURE 4, the flip-flop 21 may be reset from a variety of sources which will be explained in greater detail below. For the present it will be sufficient to state that if no "Sure Stop" signal occurs at time $T_{A3}$, e.g., due to defacing of the coupon making the "Sure Stop" mark illegible, the "Coupon Read Bracket" signal CRB will operate to reset the flip-flop at time $T_{A4}$.

If for some reason the coupon transport had jammed so that no coupons could appear, the effect would immediately be detected by the absence of Coupon Present pulses CP and the operation of the system would come to a halt. If coupons are present, however, CP pulses are derived regardless of whether or not information is read. For example, it is possible to have blank coupons which, when transported past the opening 35, cause all eighteen scanning cells to read white. The opposite condition may occur when for some reason the light sources 44 are blocked at the time scanning is to take place. Under these conditions, no image will be projected onto the scanning cells 1–18 and they will consequently read black for the coupon interval. While all-white or all-black coupons may have validity, an excessive number of such coupon readings is subject to question. As will become clear from the following explanation, in the present invention the presence of two such coupon readings will cause the Scanner Error Interlock to become active.

Let it be assumed that the coupons C and D are blank coupons. Coupon present pulses are then derived and the OS–22 pulse which occurs at time $T_{C1}$ will operate to set the flip-flop 23, as shown in FIGURE 4. Since no "Sure Start" or "Self Start" signals occur, the flip-flop 21 will remain reset as indicated by the positive signal level of the signal TCR starting at time $T_{B1}$. Accordingly, the flip-flop 23 remains in its set state, the corresponding negative output signal being applied to one input leg of the gate 28. The $\overline{\text{OS–25}}$ signal which corresponds to the CP pulse that occurs between times $T_C$ and $T_{C1}$ is applied to the other input leg of the gate 28 and the latter is rendered conductive. The one-shot multivibrator 34 is then actuated and a resultant "False Coupon Read" pulse FCR is produced at time $T_{C2}$ resulting in a "Combined Coupon Read" signal CCR.

Since the signal FF–23 goes negative at time $T_{C1}$ and the CP pulse for the coupon C occurs between $T_C$ and $T_{C1}$, the gate 24 remains closed. At time $T_D$, however, when the next coupon present pulse is initiated, the input conditions of the gate 24 are satisfied and an output pulse SEP is produced between $T_D$ and $T_{D1}$. At time $T_{D2}$ an FCR pulse is again produced, the input conditions of the gate 28 remaining satisfied. Upon the occurrence of the subsequent CP pulse at time $T_E$, an SEP pulse is again provided. The two-pulse counter 32, having received two successive pulses, now produces a "Scanner Error Interlock" signal SEI, i.e., its output signal level goes negative. In a preferred embodiment, this signal operates to shut down the entire scanner operation. If for some reason the flip-flop 21 were not in a reset state, the SEI signal would operate to reset it. Provided the subsequent coupon E is properly imprinted, a "Sure Start" pulse follows the CP pulse which occurs between $T_E$ and $T_{E1}$ to set the flip-flop 21 at time $T_{E2}$. The resultant TCR signal will then operate to reset the flip-flop 23 so as to restore normal operating conditions.

While the SEI signal will shut down the scanner operation if for any reason no information is obtained while two successive coupons are being read out, it is desirable to indicate to the subsequently connected apparatus, e.g., to a computer, that an attempt was made to read information out. This is the reason for generating a "False Coupon Read" signal which, in turn, produces a "Combined Coupon Read" signal pulse even when a blank coupon is present. It will become clear in connection with the operation of the circuit of FIGURE 5, that if a CCR signal is received without a time reference, it is indicative of the fact that an unsuccessful attempt at reading was made.

FIGURE 5 illustrates a preferred embodiment of an information-decoding circuit wherein timing signals are derived which are employed to obtain a decoded information output signal. The output of the scanning cells 1–18 in FIGURE 1 is applied to a selection circuit 60 wherein a single signal is derived for Tracks A and B, respectively. In its simplest sense the selection circuit may merely consist of an amplifier connected to the output of each scanning cell followed by a trigger circuit to provide a square wave cell output signal and appropriate buffering means for combining the outputs of those cells which scan the same track. Preferably, however, the selection circuit 60 additionally provides means for compensating for any misregistration of the track portion which is exposed through the shield opening 35 with respect to the scanning station 39, as well as means or selecting a track signal when some of the cells which scan the track under the prevailing registration conditions fail to provide an output signal due to marking, smudging, obliteration, or the like. A circuit of this kind is disclosed in the aforesaid copending application of Albert A. Wyke et al., Ser. No. 293,455.

The Track A output signal of the selection circuit 60 is applied to a one-shot multivibrator 62 which provides the information signal AP at its output, having pulses with a duration of approximately 1 μs. The Track A signal is further inverted whence it is designated $\overline{\text{Track A}}$. The latter signal is applied to a one-shot multivibrator 66, which is substantially identical to the circuit 62 and which provides an information signal AN at its output. The signals AP and AN are buffered together and are applied to one input leg of a gating circuit 68.

In similar manner, the Track B signal is directly applied to a one-shot multivibrator 70 to derive the information signal BP. The Track B signal is further inverted whence it is designated $\overline{\text{Track B}}$ and is applied to a one-slot multivibrator 74 to derive the information signal BN. The multivibrators 70 and 74 both provide pulses having a duration of approximately 1 μs. The signal BP and BN are buffered together and are applied to the other input leg of the aforesaid gating circuit 68.

The circuit 68 comprises a pair of one-shot multivibrators 64 and 72 which receive the buffered signals $AP+AN$ and $BP+BN$, respectively, to provide corresponding output pulses having a duration of the order of 33 μs. The output signals of the units 64 and 72 are connected to the input of a gate 65 whose output is coupled to another one-shot multivibrator 67. The latter provides responsive 1 μs. pulses which constitute the input signal C of the timing circuit portion of the circuit of FIGURE 5.

The input signal C is applied to one input of a two-legged gate 76 as well as to one input of a three-legged gate 78. The signal E, which is derived at the output of the gate 76, is coupled to a buffer 80 which further receives additional signals designated "One Track Run," "Sure Start," and Self Start," respectively. The output of the buffer 80 is amplified and coupled to a junction point 69, the latter being jointly buffered with the output of the gate 78 to a one-bit delay circuit 82. The delay circuit may consist of a series of multivibrators, each arranged to fire on the trailing edge of the incoming pulse so as to provide a total delay of one bit period. In tthe preferred embodiment herein, the last multivibrator of the series from which the signal D is derived, produces 50 μs. pulses. The signal D is coupled to the other input leg of the gate 76.

The junction point 69 is further coupled to a one-bit delay circuit 84 which provides an output signal F that is delayed by one bit period. The delay circuit 84 is similar to the circuit 82 but provides output pulses having a duration of ½ bit interval. The F pulses are applied to a buffer 86 whose output is coupled to a clock pulse terminal 87 from which clock pulses are derived. The terminal 87 is connected to another input leg of the aforesaid gate 78.

The junction point 69 is further coupled to a pulse absence detector 120 which may consist of a one-shot multivibrator. The period of the unit 120 is such as to provide an output pulse after a predetermined time interval has elapsed, unless it is reset earlier. In the present embodiment the interval is of the order of 1½ bit periods. The output of the pulse absence detector 120 is connected to the set input of a control flip-flop circuit 88. The output of the one-bit delay circuit 84 is connected to the reset input of the control flip-flop 88 whose output is applied to one input leg of the aforesaid gate 78.

The output of the flip-flop 88 is further coupled to one input leg of a gate 90. The output signal of the gate 90 is designated H and is coupled to the aforesaid buffer 86. The clock pulse terminal 87 is further coupled to a delay circuit 92 which provides a delay of one bit period and whose output is connected to one input leg of a gate 94. The output of the gate 94 is amplified and connected to the other input leg of the aforesaid gate 90. The signal H is further coupled to the input of a 12-bit counter 96 the output of which is connected to the other input leg of the gate 94.

The Clock signal which is derived at the terminal 87 is applied to one input leg of each of a pair of gates 98 and 100 which further receive the aforesaid signals AP and AN respectively at their input. The output of the gate 98 is applied to the set input of a flip-flop circuit 122 while the output of the gate 100 is applied to the reset input of the same flip-flop circuit. The output of the flip-flop 122 is connected to one input leg of a gate 102. The Clock signal which appears at the clock pulse terminal 87 is further applied to an inverter 104 at the output of which a $\overline{\text{Clock}}$ signal is derived which is coupled to one input leg of a gate 103. The other input of the aforesaid gate receives the "True Coupon Read" signal TCR which is derived from the circuit of FIGURE 3. The output signal of the gate 103 is amplified and is thus designated "Time Reference." It is applied to the other input leg of tthe gate 102 at whose output a decoded Track A signal is derived for transmission, together with the "Time Reference" signal to any subsequently connected equipment such as a computer. It will be understood that a decoded Track B signal is derived from a substantially identical circuit to that described above, using the Clock and $\overline{\text{Clock}}$ signals together with the signals BP and BN. The illustration of such a circuit has been omitted from the drawing for the sake of clarity.

Figure 6:
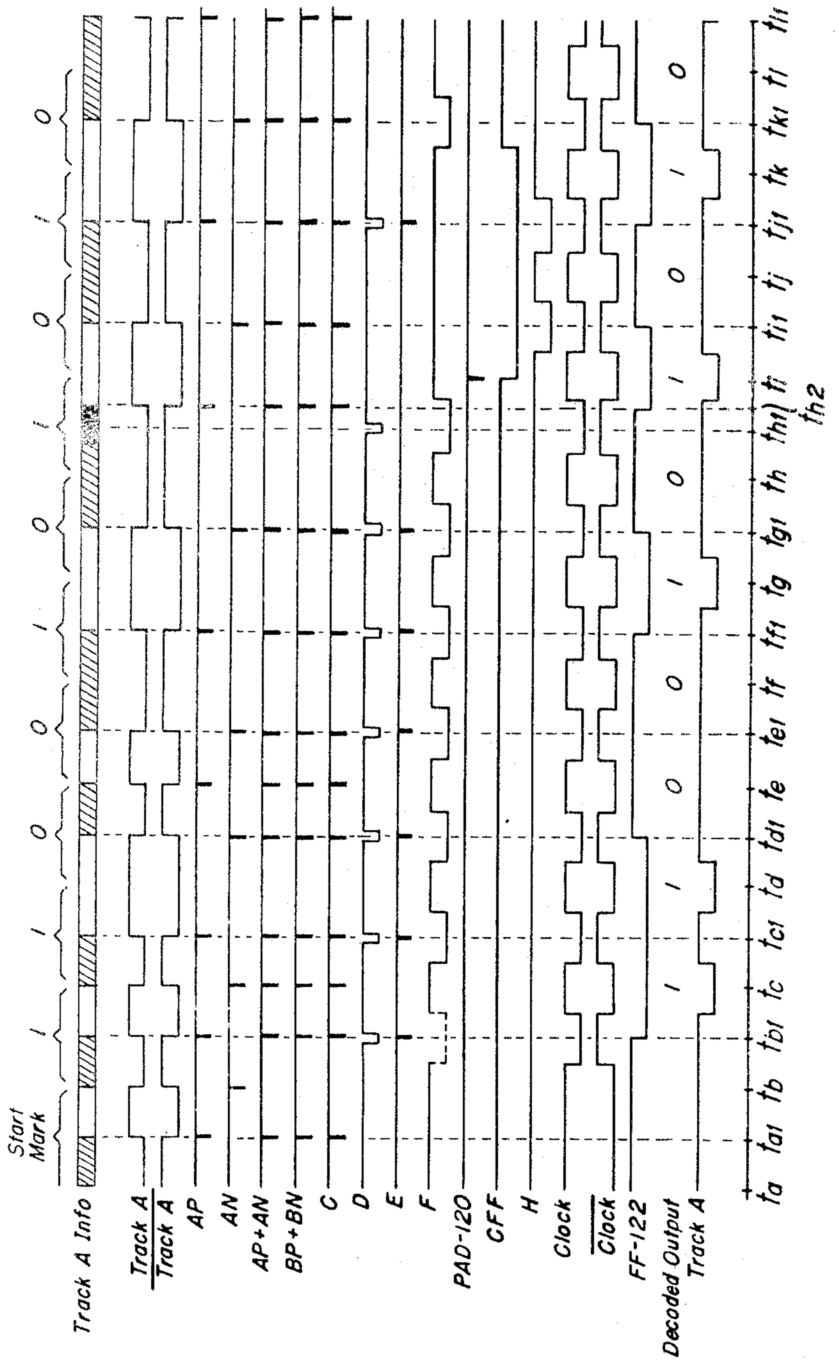
FIGURE 6 illustrates various waveforms which are applicable to the operation of the circuit of FIGURE 5.

The operation of the circuit of FIGURE 5 will become clear with reference to the waveforms of FIGURE 6. The time reference at the bottom of FIGURE 6 indicates successive bit periods which are seen to extend from $t_a$–$t_b$, $t_b$–$t_c$, etc. An example of Track A information in di-bit bar code form is shown together with the binary digits which are represented by the di-bit code. The responsive Track A signal is illustrated next in FIGURE 6 and is arbitrarily assumed to provide a negative signal level, e.g., −5 volts, for each black bar that is scanned and a zero voltage level for each white bar scanned. This convention is adopted for all waveforms represented. The $\overline{\text{Track A}}$ signal is seen to be the inverse of the Track A signal.

The information pulses AP, which are of 1 μs. duration, are obtained at the output of the one-shot multivibrator 62 in response to each positive transition of the Track A signal and are therefore referred to as positive information pulses. Similarly 1 μs. information AN pulses which appear at the output of the multivibrator 66 are derived in response to each positive transition of the $\overline{\text{Track A}}$ signal and hence upon the occurrence of each negative transition of the Track A signal. These pulses are thus referred to as negative information pulses. The BP and BN pulses are similarly designated by the polarity of the transition from which they are derived.

Upon buffering together the signals AP and AN, the signal $AP+AN$ is obtained which is shown in FIGURE 6. As previously pointed out in connection with FIGURE 2, transitions occur not only at the half-way point of the bit period such at at time $t_{a1}$, but also at the limits of a bit period such as at time $t_c$, depending upon the information represented. A representative signal $BP+BN$ is shown in FIGURE 6 and is seen to have a transition wherever one occurs in the corresponding $AP+AN$ signal, except at time $t_{h1}$. The derivation of the signal $BP+BN$ from its representative Track B information has not been shown in FIGURE 6 and it will be understood that such derivation proceeds in the same manner as the derivation of the signal $AP+AN$.

Due to the action of the multivibrators 64 and 72, an input pulse C is derived at the output of the gating circuit 68 whenever $AP+AN$ and $BP+BN$ pulses occur concurrently $\pm 33\mu s$. The time latitude thus accorded to the occurrence of the information pulses takes into account the fact that the trigger circuits in the selection circuit may be fired late or early depending on the amplitude of the output signal of the associated scanning cell. These signal amplitudes will vary in accordance with the amount of light that is reflected by the illuminated track portion that appears under the opening 35. As previously pointed out, the document may contain marks which deface one or both tracks in a manner whereby the information contained thereon is either obliterated or altered in such manner as to indicate incorrect transitions. It is also possible that the transitions are recognizable but, because of document smudging, the light contrast between the white and black areas is diminished. This will produce a lower scanning cell output signal with a resultant trigger delay. If the bit period in the example under consideration is taken to be 26 $\mu s.$, a $\pm 33$ $\mu s.$ variation constitutes approximately ⅛ bit period. Thus, the pulses which are labeled C in the drawing and which have a width of approximately 1 $\mu s.$, may be advanced or retarded by 33 $\mu s.$ The E pulses which are derived at the output of the gate 76 are applied to the delay circuit 82 which provides D pulses at its output, each having a duration of 50 $\mu s.$ and being delayed by one bit period from the originally applied pulse. It will now be seen that, since each E pulse is the result of the coincidence of a C and a D pulse, an E pulse will be produced only if the present C pulse follows the preceding C pulse by one bit period $\pm 25$ $\mu s.$ Thus, a bootstrap operation is provided which, by slaving each C pulse to the one preceding it, discriminates against pulses due to extraneous document transitions which have no information content. The conditions for producing E pulses are therefore very stringent. Since the E pulses can be considered to be timing pulses insofar as clock pulses are derived from them, as explained hereinbelow, this fact materially enhances the reliability of the readout system.

In order to obtain C pulses, transitions must occur in both tracks, regardless of whether they are positive or negative transitions, i.e., black-to-white or white-to-black transitions respectively and they must occur within ⅛ of a bit period of each other. This automatically rules out the majority of all smudges or marks on the document since these are generally of a random nature and frequently affect only one track. Even if both tracks are marked, the mark must be very nearly a vertical one so as to produce transitions within $\pm 33$ $\mu s.$ of each other.

Extraneous transitions, i.e., transitions without information content, will however occur in both tracks within the required time period and will produce C pulses. For example, in FIGURE 2B a transition is seen to occur in both tracks at time $t_h$, such transitions merely indicating the boundary between two adjacent bits and having no further information value. The C pulse produced in response thereto will, however, fail to produce an E pulse if the operation was properly started by a start mark, as its discussed hereinbelow.

The C pulse produced at time $t_h$ will follow that produced at time $t_{g1}$ by one-half bit period, i.e., by 133 $\mu s.$ in the example under consideration. Since the C pulse which occurs at time $t_{g1}$ produces a D pulse at time $t_{h1}$ $\pm 25$ $\mu s.$, the gate 76 will not open to admit the C pulse produced at time $t_h$. Thus, in orer for a non-information mark to produce an E pulse, it must cover both tracks. It must, moreover, be nearly vertical so as to produce transitions within $\pm 33$ $\mu s.$ of each other in the two tracks and it must occur within $\pm 25$ $\mu s.$ of the time $t_{g1}$. It will be apparent that these criteria exclude the vast majority of non-information marks which result in transitions.

In FIGURE 6, Track A is seen to contain a start mark which ends at time $t_b$. In accordance with the foregoing circuit operation, a start mark-derived pulse is presumed to have been buffered to the junction point 69 and thence to the one-bit delay circuit 82 at time $t_{a1}$ to produce a D pulse at time $t_{b1}$. Thus, the C pulse which occurs at time $t_{a1}$ is ineffective to produce an E pulse, the latter appearing for the first time at time $t_{b1}$ under the assumed operating conditions. The F pulse which occurs at time $t_{b1}$ is derived from the start mark occurring at time $t_{a1}$ and is indicated in broken lines. The F pulse which occurs at time $t_{c1}$ is, however, derived from the first E pulse at time $t_{b1}$.

Under ordinary conditions, the F pulses are buffered to the clock pulse terminal where clock pulses are derived which are one-half bit period wide, as shown in FIGURE 6. The $\overline{\text{Clock}}$ pulses which are derived at the output of the inverter 104 are similarly one-half bit period wide.

On occasion a transition in the information track is obliterated either by marks or smudges on the document. For example, while a binary ONE was originally printed in Track A between time $t_h$ and $t_i$, (FIGURE 6), the transition at time $t_{h1}$ is obliterated by the presence of a smudge which extends to $t_{h2}$. As a consequence, the Track A and $\overline{\text{Track A}}$ signal will show corresponding level changes at time $t_{h2}$. An AP pulse will then occur at time $t_{h2}$ which similarly appears in the signal $AP+AN$. No C pulse will occur at time $t_{h1}$ due to the absence of either an AP or AN pulse at that time.

Let it be assumed that Track B is smudged in the same manner as Track A so that the signal $BP+BN$ displays a pulse at time $t_{h2}$. As a consequence, a C pulse will occur at time $t_{h2}$. The 50 $\mu s.$ wide D pulse which occurs at time $t_{h1}$, and which is related to the E pulse at time $t_{g1}$, is not wide enough to occur simultaneously with the C pulse at time $t_{h2}$. As a consequence, the gate 76 will remain closed and no E pulse will be produced. At time $t_{h1}$ an F pulse will appear at the output of the delay circuit 84 as a consequence of the E pulse that occurred during the preceding bit period.

As previously explained, the pulse absence detector 120 may be a one-shot multivibrator of the kind which, unless reset at 1½-bit period intervals or sooner, will produce an output pulse. If E pulses appear at bit period intervals, the output signal PAD–120 of the pulse absence detector will remain zero. In the present case, no E pulse having occurred between $t_{g1}$ and $t_i$, i.e., for 1½-bit periods, the signal PAD–120 displays a pulse which is operative to set the control flip-flop 88, so as to switch the output signal CFF of the latter negative.

The F pulse which occurs at $t_{h1}$ is applied to the one-bit delay circuit 92. One bit period thereafter, at time $t_{i1}$, the latter circuit applies a responsive pulse to one input leg 94. The other input leg receives a negative signal from the 12-bit counter 96 whose output signal remains true (negative) until the count of 12 is reached. Under normal conditions therefore, the input conditions of the gate 94 are satisfied and an output signal is applied to one input leg of the gate 90. If CFF is negative, the input conditions of the gate 90 are satisfied and an H pulse one-half bit period wide is produced, as shown at time $t_{i1}$ in FIGURE 6. The aforesaid H pulse is buffered to the clock pulse terminal 87 where it constitutes a substitute clock pulse of the same width and occurring in clock synchronism.

At time $t_{j1}$, no F pulse has as yet been produced to reset the control flip-flop 88. Thus, the foregoing operation is repeated, the H pulse which was produced at time $t_{i1}$ being delayed by one bit period by the circuit 92 and being subsequently coupled to the gate 90 to form the next H pulse at time $t_{j1}$. The operation may be repeated for as long as 12 bit periods if no F pulse is formed for that length of time, each H pulse advancing the counter 96 by one count. When the count of 12 is reached, a positive counter output signal is produced and gate 94 will open. No further substitute clock pulses can then be produced.

By the use of check bits which form part of the information tracks, lost or incorrectly read out information may be reconstructed. Although the technique whereby this is carried out is beyond the scope of the present invention, it is noted here that up to 12 bits may be reconstructed in each track of the coupon used in the present invention. It will be readily apparent that the loss of 12 bits, e.g., due to obliteration, will also mean that no clock pulses are derived from the document information. As such, substitute clock pulses must be generated in the manner explained hereinabove.

The negative CFF signal which was initiated at time $t_i$, is further coupled to one input leg of the gate 78. The latter gate additionally receives clock pulses from the terminal 87, as well as C pulses. At time $t_{h2}$ a C pulse is formed which, as seen from the drawing, fails within the duration of the clock pulse that is centered about $t_{h1}$. However, the signal CFF does not go negative until time $t_i$ and as a consequence the gate 78 does not become conductive prior to $t_i$.

As explained above, clock pulses will be produced for up to 12 bit periods following the failure to produce F pulses in the absence of transitions in both tracks at the proper time. At time $t_{i1}$, when the next C pulse occurs, a clock pulse also exists and the signal CFF is negative. As a consequence, the gate 78 becomes conductive and a D pulse is produced one bit period later, at time $t_{j1}$. The latter pulse, in conjunction with the simultaneously occurring C pulse, then produces an E pulse at time $t_{j1}$ which, in turn, produces an F pulse one bit period thereafter, at time $t_{k1}$. The operation of the circuit thus returns to normal without interruption of the clock pulses, while clock synchronism is maintained due to the fact that each pulse generated is slaved to the previously occurring pulse.

For the purpose of decoding the signals that are read out from the information Track A, the clock pulses are gated together with the information pulses AP and AN in the gates 98 and 100, respectively. For example, an AP pulse occurs at time $t_{b1}$ which is gated with the concurrently existing clock pulse to set the flip-flop 122. This produces an output signal which has a negative signal level. Provided a TRC signal prevails at time $t_c$, the aforesaid negative signal level is gated with the $\overline{\text{Clock}}$ signal to produce a negative output pulse in the "Decoded Output Track A" signal that is indicative of a binary ONE. This binary ONE corresponds to that which is represented at time $t_{b1}$ by the Track A information bar code. Hence, a decoded output signal is derived one-half bit period after the information was scanned on the track.

It will be noted that the smudge that extends from $t_{h1}$ to $t_{h2}$ does not destroy the veracity of the read-out information. If, however, the marks were to extend sufficiently close to $t_i$ so as to fall within the $\overline{\text{Clock}}$ pulse that is centered about $f_i$, incorrect data may be read out. As explained above, the circuit can operate on its own sustained clock for 12 bit periods during which no clock pulses are derived from the information tracks. Since the reason for not deriving clock pulses must be due to marking or defacing of the coupon, or due to the actual destruction of a portion of the coupon, it is probable that incorrect information or no information will be read out as well. As will become clear from the discussion hereinbelow, in the present invention such incorrectly read out information is appropriately identified.

Because of the particular organization of the information in the two tracks, up to 12 bits of incorrectly read out data may be reconstructed from check bits which are printed on each track together with the information. The manner in which this is carried out is beyond the scope of the present application, but it should be noted that an even larger information loss may occur in each track without completely losing the remaining information in that track. In the latter case, however, no more than 12 adjacent bits may be missing so that clock pulses may continue to be derived.

A decoded output signal for Track B is derived in the same manner as in the case of Track A. Since the circuits are substantially identical, only one has been illustrated for the sake of simplicity.

*Sure start circuit*

Figure 7:
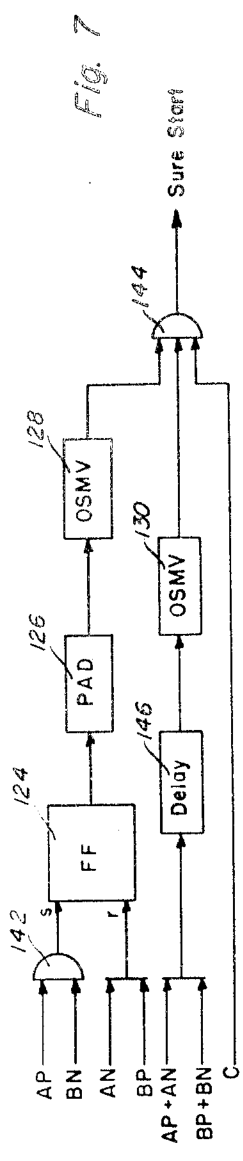
FIGURE 7 illustrates a circuit for initiating the operation of the circuit of FIGURE 5.

FIGURE 7 illustrates the "Sure Start" circuit whose output signal is coupled to the buffer 80 in FIGURE 5. The information signals AP and BN, which are derived at the outputs of the one-shot multivibrators 62 and 74 in FIGURE 5, are coupled to separate input legs of a gate 142 whose output is connected to the set input of a flip-flop 124. The signals AN and BP, which are derived from the one-shot multivibrators 66 and 70 respectively in FIGURE 5, are buffered to the reset input of the flip-flop 124. The output of the flip-flop 124 is coupled to a pulse absence detector 126 which may be similar in construction to the pulse absence detector 120 in FIGURE 5. In the present embodiment of the invention, the absence response time of the unit 126 is assumed to be slightly less than two bit periods. The output of the latter circuit is connected to a one-shot multivibrator 128 whose output, in turn, is connected to one input leg of a gate 144.

The signals $AP+AN$ and $BP+BN$, both of which are derived in the circuit of FIGURE 5, are buffered to the input of a delay circuit 146. The latter has a delay interval of approximately two bit periods and its output is coupled to a one-shot multivibrator 130 which is further connected to another input leg of the aforesaid gate 144. The third input leg of the latter gate receives the input signal C which is derived at the output of the gating circuit 68 in FIGURE 5. A "Sure Start" signal is derived at the output of the gate 144 when negative signals appear on all three input legs.

Figure 8:
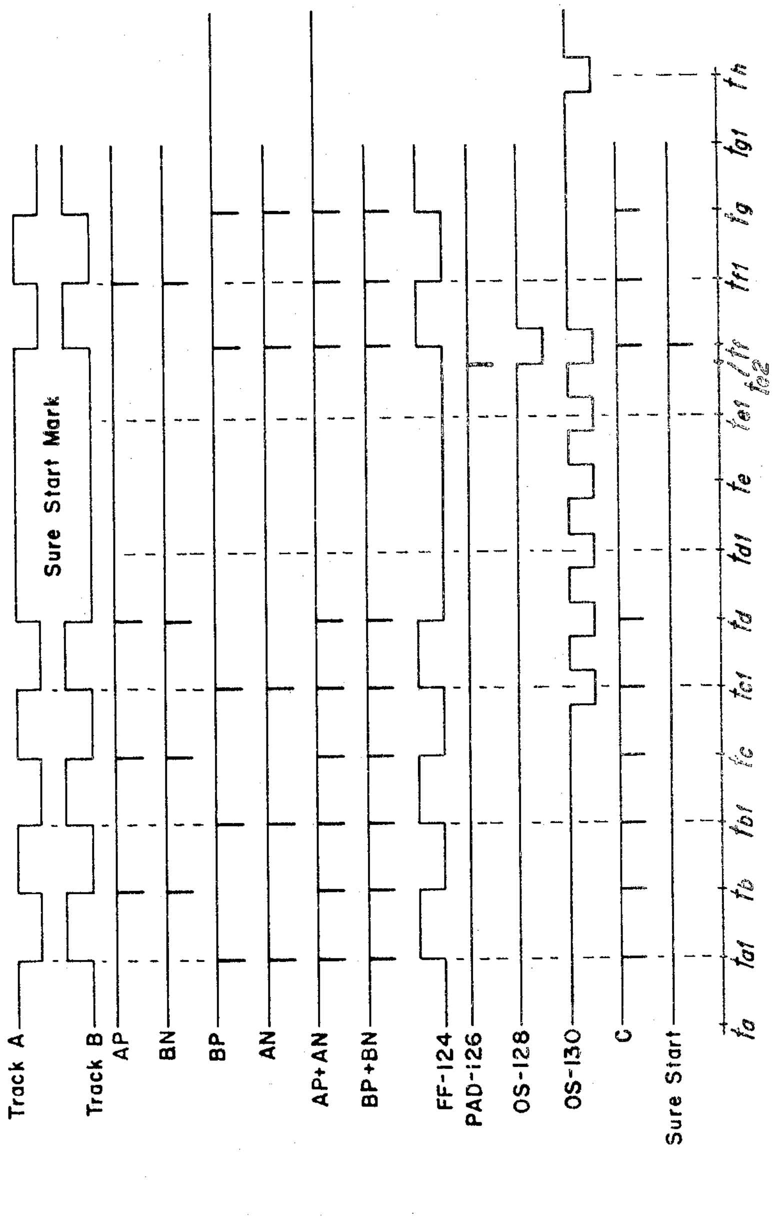
FIGURE 8 illustrates various waveforms which are applicable to the operation of the circuit of FIGURE 7.

The operation of the circuit of FIGURE 5 will be explained with reference to the waveforms of FIGURE 8. Reference is also had to FIGURE 2A wherein a Start Mark is illustrated, drawn to a corresponding time scale. As before, the signals which are derived in response to the Track A and Track B bar codes are labeled Track A and B respectively in FIGURE 6. Between $t_a$ and $t_d$ the alternately black and white bars of the track leader are scanned so that the Track A signal varies periodically between 0 and $-5$ volts. At time $t_d$ when there is a transition from black to white, the signal rises to 0 while the Track B signal simultaneously becomes negative in response to a transition from white to black. The respective signal levels are maintained for two bit periods until time $t_f$ when opposite transitions again occur.

It will be seen from FIGURE 2C that the "Sure Stop" mark is the reverse of the Sure Start mark insofar as the Track A and Track B information is concerned. Consequently, the Track A "Sure Stop" signal will be identical with the Track B "Sure Start" signal. Conversely, the Track B signal for the "Sure Stop" mark will be identical with the Track A signal of the "Sure Start" mark. The following discussion will be confined to the "Sure Start"

mark only and it will be understood that similar criteria apply for the "Sure Stop" mark.

The recognition criteria of the "Sure Start" mark must be restrictive so that a positive reference point may be reliably established for the location of each bit which is read off the document. The fact that two reference points are available, one in each track, creates a desirable redundancy which makes it possible to read the "Sure Start" mark from one track if the other track is marked up, smudged or obliterated. It is essential that these reference marks be distinguished from every form of smudge marking on the document. In fact, since self-starting is available as explained hereinbelow, it is preferable to lose the "Sure Start" reference altogether than to read the information from a false reference. Accordingly, the criteria for "Sure Start" mark recognition, which are set forth below, are very restrictive:

(1) Transition A is present.
(2) Transition B is present.
(3) Transition A is white to black.
(4) Transition B is black to white.
(5) A and B are simultaneous transitions (±33 μs.).
(6) Transition D is present.
(7) Transition C is present.
(8) D and C are simultaneous transitions (±33 μs.).
(9) A "and" B occur two-bit periods before D "and" C (±33 μs.).
(10) No transition occurs between A and D.
(11) No transition occurs between B and C.

Implied in the foregoing are the following criteria:

(12) D is black to white.
(13) C is white to black.

The pulses AP and AN are derived in response to positive and negative level changes of the Track A signal. Similarly the pulses BP and BN are derived in response to positive and negative level changes respectively of the Track B signal. When AP and BN pulses occur simultaneously, the gate 142 conducts to set the flip-flop 124. This is seen to occur at times $t_b$, $t_c$ and $t_{f1}$ respectively. Resetting of the flip-flop is effected by either an AN or BP pulse, such as occurs at times $t_{a1}$, $t_{b1}$, $t_{c1}$, $t_f$ and $t_g$.

As explained above, the pulse absence detector 126 has a period of somewhat less than two bit periods whereby a pulse is produced if a negative signal level change does not occur for the aforesaid time interval. Thus, following the initiation of the "Sure Start" mark at $t_d$, the circuit 126 produces a negative pulse at time $t_{f2}$ which is coupled to the one-shot multivibrator 128. As seen from FIGURE 8, the latter responds by producing a negative pulse of approximately one-fourth bit duration which is coupled to one input leg of the gate 144.

The signals $AP+AN$ and $BP+BN$ are delayed by two bit periods before being applied to the multivibrator 130 at time $t_{a1}$. The resultant negative output pulses start at time $t_{c1}$ and are seen to be approximately one-fourth bit period wide. These pulses are further coupled to one input leg of the gate 144. The gate 144 further receives C pulses which are seen to occur at half-bit intervals between $t_a$ and $t_d$ and between $t_f$ and $t_g$. At time $t_f$ the input conditions of the gate 144 are satisfied and a "Sure Start" pulse appears at the output, as shown in FIGURE 8.

*Self-start circuit*

Figure 9:
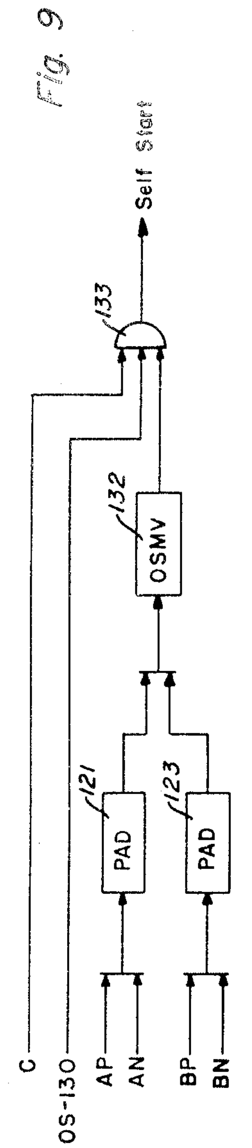
FIGURE 9 illustrates another circuit for initiating the operation of the circuit of FIGURE 5.

In view of the stringent criteria adopted for "Sure Start" mark recognition, a "Sure Start" signal is not always generated. If the "Sure Start" mark is missed, self-starting is attempted in the present invention from the information contained in the tracks. The circuit for self-starting is illustrated in FIGURE 9 and its operation will be explained with reference to FIGURE 2B and the waveforms of FIGURE 10 which are drawn to the same time scale.

The criteria for self-start are as follows:

(1) At self-start ($t_{e1}$) minus 2 bit periods ($t_{c1}$) transition A or transition B must be present.

(2) At self-start minus one bit period ($t_{d1}$) have a transition (C) at the beginning of a mark that is one bit period wide.

(3) Have no transition for one bit period following transition C. (Example: The interval $t_{d1}$–$t_{e1}$ in Track B.)

(4) Transition E must be present.

(5) Transition D must be present.

(6) Transitions E and D must occur simultaneously ±33 μs.

(7) Requirement No. 1 must occur two bit periods ±33 μs. before requirement No. 6.

The foregoing criteria are implemented in the circuit of FIGURE 9. Track A and B signals are illustrated for the time interval $t_a$–$t_f$ in FIGURE 10 and the pulses derived for positive and negative signal level changes for the respective tracks are appropriately labeled AP, AN, BP and BN, respectively. The AP and AN signals are seen to be buffered to a pulse absence detector 121 which may be substantially identical to the corresponding unit 120 in FIGURE 5. Similarly, the signals BP and BN are buffered to the input of a pulse absence detector 123 which is substantially identical in construction to the unit 121. The parameters of the circuits 121 and 123 are such that, if no input pulses are received for an interval of approximately 200 μs., i.e., for slightly less than one bit period, a negative pulse is produced. These pulses are buffered to the input of a one-shot multivibrator 132 which provides responsive pulses approximately one-fourth bit period wide. The output of the latter circuit is coupled to one input leg of a gate 133. The remaining input legs of the latter gate receive the aforesaid signals C and OS–130 which are derived in the circuits of FIGURES 5 and 7, respectively. The "Self Start" signal is derived at the output of the gate 133.

Figure 10:
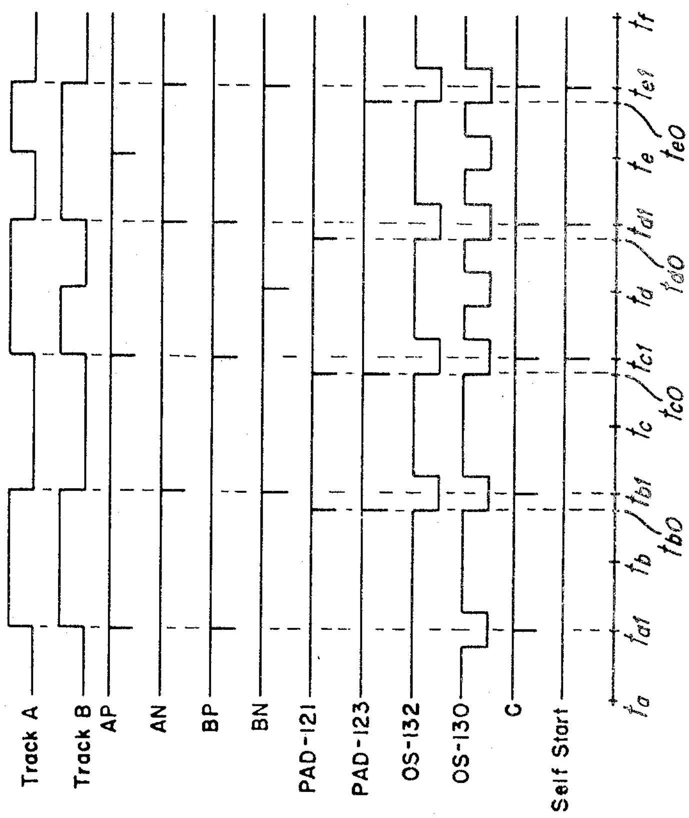
FIGURE 10 illustrates various waveforms which are applicable to the operation of the circuit of FIGURE 9.

From FIGURE 10 it will be seen that the output signal PAD–121 of the pulse absence detector 121 contains negative pulses at times $t_{b0}$, $t_{c0}$ and $t_{d0}$. The output signal PAD–123 of the pulse absence detector 123 is seen to have negative output pulses at times $t_{b0}$, $t_{c0}$ and $t_{e0}$. Accordingly, the one-shot multivibrator 132 will initiate negative output pulses at times $t_{b0}$, $t_{c0}$, $t_{d0}$ and $t_{e0}$, the circuit parameters being such that the pulses have a duration of approximately one-fourth bit period.

For the assumed set of conditions, the signal OS–130 will display negative pulses centered about $t_{a1}$, $t_{b1}$, $t_{c1}$, $t_d$, $t_{d1}$, $t_e$ and $t_{e1}$, while the C pulses will occur at times $t_{a1}$, $t_{b1}$, $t_{c1}$, $t_{d1}$ and $t_{e1}$. The exemplary "Self Start" criteria listed above are seen to be met at time $t_{e1}$. It will be noted from FIGURE 1, however, that "Self Start" pulses are also derived at times $t_{c1}$ and $t_{d1}$, the proper starting conditions having been present during the two-bit interval preceding $t_{c1}$ and $t_{d1}$ respectively. While the probability of the occurrence of "Self Start" pulses is reasonably high, there is no certainty that this will happen. When the "Sure Start" mark is missed, the information contained in the tracks is read out only from such point on as first the conditions for generating provides a "Self Start" pulse.

While the requirements for self-starting are less stringent than those for sure-starting, it is essential that the "Self Start" pulse start the clocking operation in proper phase. The reason therefor resides in the fact that, due to its binary digital character, information may be read out 90° out of phase, without apparent error. That is to say, if started 90° out of phase, the clock will continue to operate in the same manner to read out erroneous information. Accordingly, appropriate safeguards must be taken to indicate the occurrence of phase errors, as discussed hereinbelow. Once the clock pulses are lost for any reason, self-starting will not start the reading operation again. It would be impossible under these conditions to tell how much information was lost and hence any attempt at reconstructing the information would be frustrated.

*One-track run*

As previously pointed out, the information contained in the separate tracks of the document is not the same. Accordingly, the loss of information in one track due to marking of the document, smudging, obliteration or the like, does not eliminate the necessity of reading the other track. As a consequence, clock pulses must still be derived for the purpose of obtaining a decoded output signal from the track signal which is derived from the readable information track.

As explained in connection with the circuit of FIGURE 5, it is essential that the clock pulses occur during the proper time intervals, so that only those transitions are read out which have the proper information value. Where clock pulses must be derived from a single track only, the criteria must accordingly be even more stringent than those applicable for two-track operation. These criteria are set forth below with reference to FIGURE 2B, it being assumed that Track B is the good track:

(1) At clock time ($t_{e1}$) minus 2 bit periods ($t_{c1}$) transition B must be present.

(2) At clock time minus one bit period ($t_{d1}$) transition C must be present.

(3) No transition must occur in the good track for one bit period following requirement No. 2. (Example: $t_{d1}$–$t_{e1}$.)

(4) Transition E must be present.

(5) Requirement No. 1 must occur two bit periods prior to Requirement No. 4.

(6) Requirement No. 2 must occur one bit period before Requirement No. 4.

Figure 11:
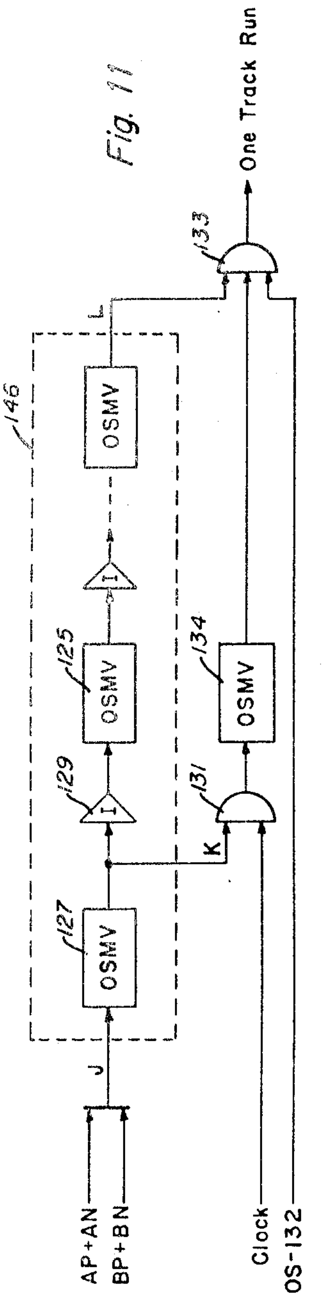
FIGURE 11 illustrates a circuit for assuring continuity of operation under certain restricted conditions.

The foregoing criteria are implemented in the circuit of FIGURE 11 which is explained hereinbelow with reference to the pertinent waveforms shown in FIGURE 12. Any pulses occurring due to transitions in either track, whether positive or negative, are buffered to the delay circuit 146, as explained in connection with the circuit of FIGURE 7. The input signal applied to the delay line is designated J and is further illustrated in FIGURE 12.

The delay circuit is seen to consist of a series of one-shot multivibrators, each followed by an inverter. For the purpose of illustrating the internal operation of the delay circuit, some of the waveforms are shown herein. As before, each one-shot multivibrator is assumed to be responsive only to negative pulses to provide an output pulse having a predetermined duration. For example, the circuit 127 provides an output signal K which is seen to have pulses approximately one-third bit period wide for each J pulse applied. Upon being inverted by the inverter 129, the trailing edge of each of the aforesaid K pulses is negative-going and triggers the one-shot multivibrator 125 whose responsive output signal OS–125 is also shown in FIGURE 12. Thus, the K pulse which is initiated by the J pulse that occurs at time $t_{a1}$, in turn produces an OS–125 pulse that is centered about $t_d$.

A signal designated L is derived at the output of the delay circuit 146. Each L pulse is one-eighth bit period wide and is seen to be displaced from its corresponding J pulse by two bit periods. For example, the L pulse at time $t_{c1}$ is derived from the J pulse which occurs at time $t_{a1}$. The K signal is applied to one input leg of a gate 131, the other input leg of which receives clock pulses. As explained in connection with FIGURES 5 and 6, the clock pulses are one-half bit period wide and occur at one-bit intervals. If the input conditions of the gate 131 are satisfied, a responsive output signal is obtained. This is applied to a one-shot multivibrator 134 and provides output pulses OS–134, approximately one-eighth bit period wide.

The OS–134 pulses are applied to one input leg of a gate 133. At separate input legs the gate 133 additionally receives the L signal as well as the signal OS-132 which was derived in connection with the circuit of FIGURE 9.

If the input conditions of the gate 133 are satisfied, "One Track Run" pulses are obtained at its output. The latter pulses are buffered to the junction point 69 of the circuit of FIGURE 5, as discussed above.

Figure 12:
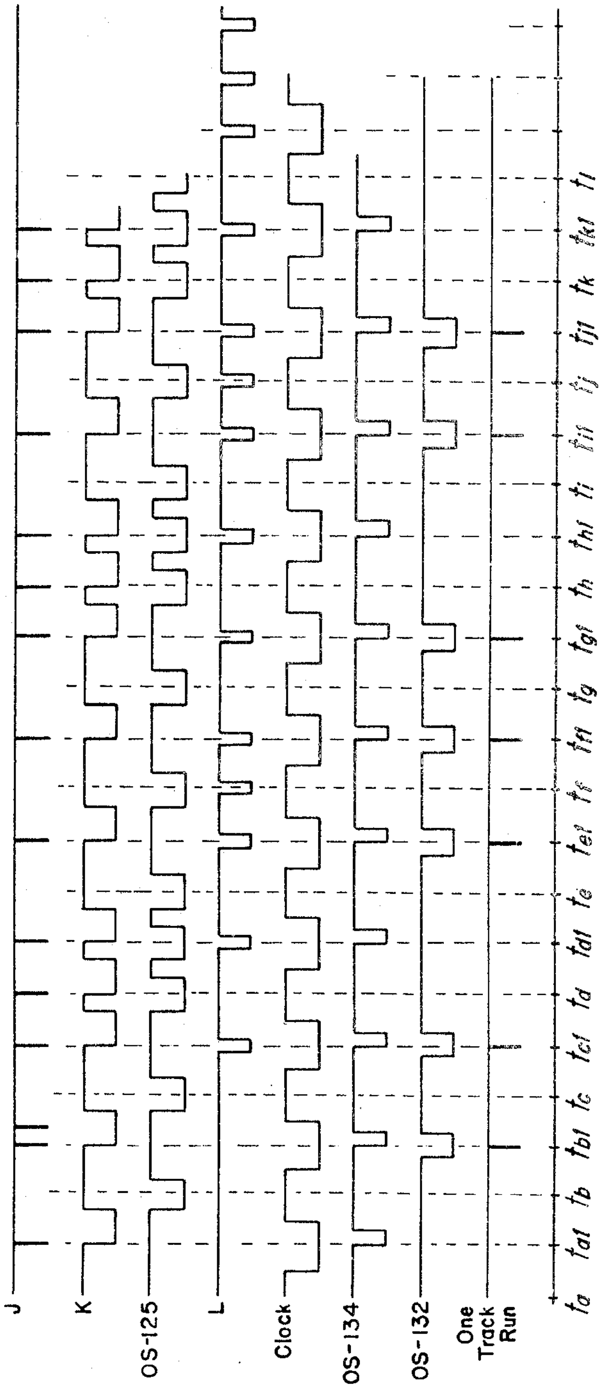
FIGURE 12 illustrates various waveforms which are applicable to the operation of the circuit of FIGURE 11.

The time scale of FIGURE 12 corresponds to that employed in FIGURE 2B and it will be noted that a "One Track Run" pulse is obtained at time $t_{e1}$ as discussed. Such pulses are further derived at times $t_{b1}$, $t_{c1}$, $t_{f1}$, $t_{g1}$, $t_{i1}$ and $t_{j1}$. It will be noted that they are not derived at regular clock intervals since the requisite conditions are not always present. Thus, no pulses are derived at times $t_{d1}$, $t_{h1}$ and $t_{k1}$ due to the absence of OS–132 pulses which is in turn due to the presence of transitions at times $t_d$, $t_h$ and $t_k$ respectively. A transition will not occur at half-bit interval time in the track under consideration when two successive binary digits are alike. It will be noted with reference to the circuit of FIGURE 5, that the 12-bit counter 96 will provide clock pulses during such intervals. It is necessary, however, that clock pulses be obtained at intervals no greater than 12 bit periods. This means that a track may not be defective for more than 12 adjacent bit intervals. It will also be noted that the "One Track Run" operation has no provisions for starting on its own and must depend on the "Sure Start" or "Self Start" signals for its initiation.

*Error detection*

As previously explained, information that was either destroyed or incorrectly read out may be reconstructed. To this end, each bit which is incorrectly read out must be properly identified. Such readout must not only identify whether or not the transistion was incorrectly read, but must be further cognizant of whether or not a transition that was read had information significance. The reason for this, as explained above, lies in the fact that transitions may occur at times other than the center of a bit period, e.g., at the end of a bit period, which do not have information significance. If the phase of the clock pulses is incorrect, e.g., if clock pulses are developed 90° out of phase, erroneous information will be read out.

Figure 13:
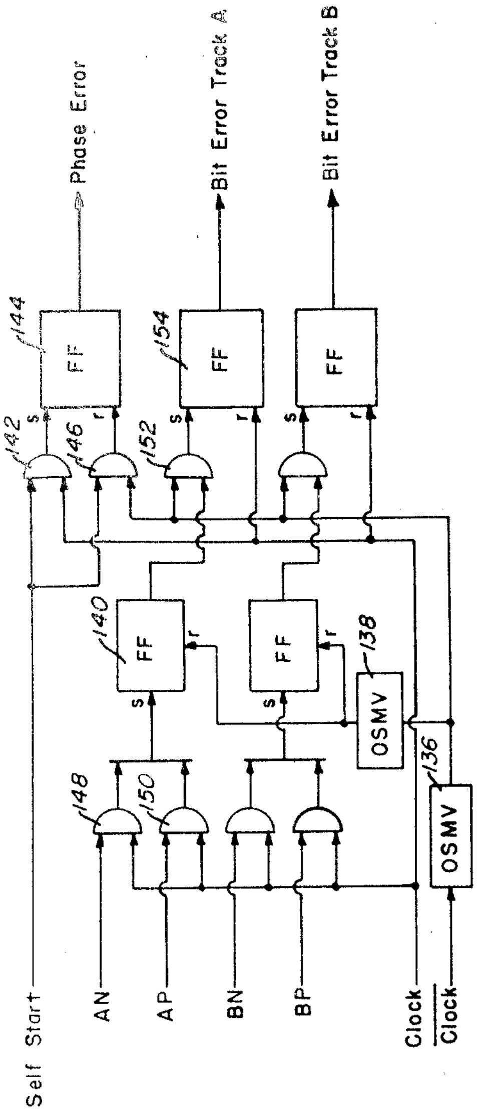
FIGURE 13 illustrates a circuit for recognizing errors in the output of the circuit of FIGURE 5.
Figure 14:
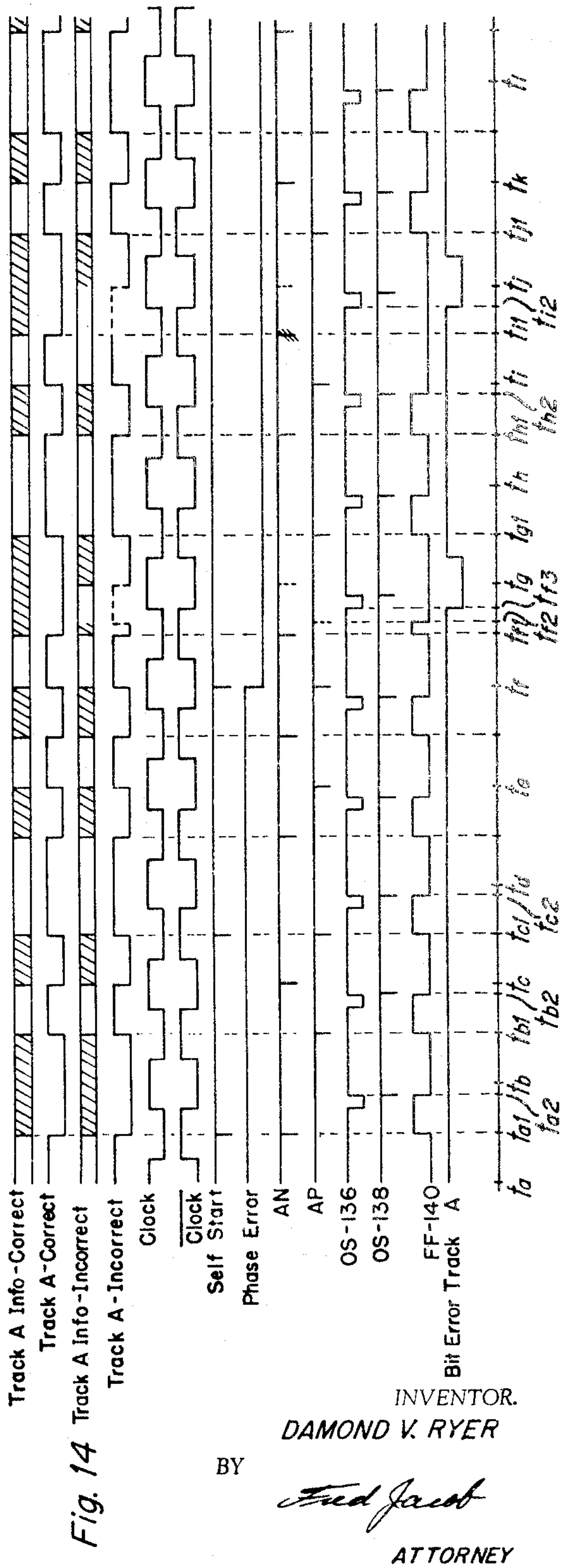
FIGURE 14 illustrates various waveforms which are applicable to the operation of the circuit of FIGURE 12.

FIGURE 13 illustrates apparatus for identifying information in the aforesaid manner, the operation being explained with reference to the pertinent waveforms shown in FIGURE 14. In FIGURE 14 correct bar code information for Track A is illustrated together with the correct Track A signal corresponding thereto. There is also shown incorrect Track A bar code information wherein an obliterating mark eliminates a portion of the printed bar code between the time $t_{f2}$ and $t_g$. An error is also shown between $t_i$ and $t_{i1}$ where the printed bar code is obliterated for approximately one-half bit period. The difference between the correct and incorrect Track A signals is indicated in the broken-line portion of the waveform.

In order to indicate phase errors, the "Self Start" signal which was derived in the circuit shown in FIGURE 9, is applied to one input leg of a gate 142 whose other input leg receives clock pulses. The output of the gate 142 is coupled to the set input of a flip-flop circuit 144. A gate 146 is connected to the reset input of the flip-flop 144 and receives the aforesaid "Self Start" signal on one input leg thereof and the $\overline{\text{Clock}}$ pulses at another input leg. The "Phase Error" signal is derived at the output of the flip-flop 144 and is assumed to be at the zero voltage level as long as "Self Start" pulses occur concurrently with the clock pulses.

As explained in connection with FIGURES 9 and 10, the "Selt Start" pulses may be used to initiate the generation of clock pulses in clock synchronism. Since the "Self Start" pulses ar ederived from the information tracks throughout the scanning of the document, they provide a useful reference against which all clock pulses may be compared for phase errors. Proper "Self Start" pulses are assumed to occur at times $t_{a1}$ and $t_{c1}$, as seen in FIGURE 14. Since these occur in phase with the clock pulses, the "Phase Error" signal remains at the zero voltage level. At time $t_f$ a "Self Start" pulse is assumed to occur in phase with a $\overline{\text{Clock}}$ pulse. Accordingly, the gate 146 will become conductive to apply a reset signal to the flip-flop circuit 144 so as to switch the level of the "Phase Error" signal negative. As explained in connection with the circuit of FIGURE 9, once the phase is lost, no attempt is made to continue reading the information. Accordingly, the negative "Phase Error Signal" level may indicate to a subsequently connected computer that a coupon has not been read.

The circuit of FIGURE 13 also provides "Bit Error" indications for both document tracks. The criteria for the generation of "Bit Error" signals are as follows:

(1) The error must occur at clock time.

(2) A transition is missing because (a) the black portion of the bar code has been removed;

(b) the black portion of the bar code (or portion thereof) has been marked in white.

(3) Erroneous transitions exist because (a) the black portion of the bar code has been extended into the white portion beyond its proper point;

(b) a black mark exists in the white portion resulting in two transitions.

Some of the foregoing conditions are illustrated by the incorrect bar code in Track A in FIGURE 14, from which the incorrect Track A signal is derived. Negative and positive transitions of the incorrect Track A signal then give rise to corresponding AN and AP pulses, as illustrated in FIGURE 14. At time $t_{f2}$ an incorrect AP pulse is derived. Incorrect AN pulses are obtained at times $t_g$ and $t_j$. It will be further noted that the obliteration at time $t_{i1}$ of the transition in Track A, causes the normally derived AN pulse to be lost.

In the circuit of FIGURE 13, the AN signal is applied to the input leg of a gate 148 whose other input leg is connected to receive clock pulses. Similarly, the AP signal is coupled to one input leg of a gate 150 whose other input leg is connected to receive clock pulses. The outputs of the gates 148 and 150 are buffered to the set input of a flip-flop circuit 140.

A one-shot multivibrator 136, which produces pulses having a width of approximately one-eighth bit period, is connected to receive $\overline{\text{Clock}}$ pulses at its input. The output of the multivibrator 136 is connected to a one-shot multivibrator 138 whose output is coupled to the reset input of the aforesaid flip-flop 140. A flip-flop circuit 154 has its set input connected to the output of a gate 152 while its reset input is connected to receive clock pulses. The gate 152 has one input leg connected to the output of the flip-flop circuit 140 and another input leg coupled to the output of the multivibrator 136.

When the input conditions of either the gate 148 or 150 are satisfied, the flip-flop 140 is set, as indicated by the appropriate negative pulses of the waveform FF–140 in FIGURE 14 in response to the occurrence of AN or AP pulses jointly with clock pulses. Each $\overline{\text{Clock}}$ pulse energizes the one-shot multivibrator 136 which provides a responsive output pulse one-eighth bit wide. The one-shot multivibrator 138 responds to the output pulses of the waveform OS–136 to provide relatively narrow output pulses of the order of 1/16 bit period in the waveform OS–138. The latter pulses are operative to reset the flip-flop 140 at times $t_{a1}$, $t_{b1}$, $t_{c1}$, etc., unless the latter is already in its reset position. The resetting action is indicated by the waveform FF–140 which is seen to revert to a negative level upon the appearance of the OS–138 pulses at times $t_{a2}$, $t_{b2}$ and $t_{c2}$.

As may be seen from FIGURE 14, under ordinary conditions the negative pulses derived from the one-shot multivibrator 136 occur when the flip-flop 140 is in its set state so as to provide a positive output signal level. Accordingly, the input conditions of the gate 152 are not satisfied and the flip-flop circuit 154 remains in its reset state which is periodically determined by the appearance of clock pulses. At time $t_{f2}$ an erroneous AP pulse occurs while at time $t_g$ an erroneous AN pulse occurs. The latter pulse, being out of phase with the clock pulses, will not affect the operation of the flip-flop circuit 140. However, the AP pulse which appears at time $t_{f2}$ occurs concurrently with the clock pulse that is centered about time $t_{f1}$ and hence the flip-flop 140 will be reset. Upon the occurrence of the next OS–136 pulse at time $t_{f3}$, the input conditions of the gate 152 are satisfied and the flip-flop 154 is set, resulting in a negative pulse in the "Bit Error" signal for Track A. Upon the appearance of the next clock pulse at time $t_{g1}$, the flip-flop circuit 154 is again reset.

The obliteration of the Track A information between $t_{i1}$ and $t_j$ results in the loss of the AN pulse that should have occurred at time $t_{i1}$ and further produces an erroneous AN pulse at time $t_j$. Under these conditions, the flip-flop circuit which was reset at time $t_{h2}$ will remain in its reset state. This is due to the fact that the erroneous AN pulse at time $t_j$ occurs out of phase with the clock pulses and hence it is incapable of setting the flip-flop 140. The latter is set at time $t_{j1}$ upon the occurrence of the next AP pulse. The input conditions of the gate 152 are satisfied at time $t_{i2}$ since a negative OS–136 pulse occurs concurrently with the negative signal output level of the flip-flop circuit 140. As a consequence, the flip-flop circuit 154 is set and a negative "Bit Error" pulse is produced for Track A. As before, the resetting of the flip-flop 154 occurs upon the appearance of the next clock pulse.

It will be noted that error indications occur at $\overline{\text{Clock}}$ time, immediately succeeding the absence or the erroneous presence of a transition. As will appear from a consideration of FIGURES 5 and 6, the $\overline{\text{Clock}}$ signals are also used to sample the AP and AN pulses which occur during the previous half of a bit period to obtain decoded output signals. Thus, a "Bit Error" indication is provided simultaneously with the occurrence of the erroneous decoded output signal.

"Bit Error" signals for Track B are derived from BP and BN pulses in substantially the same manner as described in connection with Track A above. As will be seen from FIGURE 13, the circuitry is substantially identical and hence the description thereof and of its operation have been omitted for the sake of simplicity.

From the foregoing discusson it will be seen that the preferred embodiment of the present invention is directed to a document scanner for reading out a di-bit bar code which represents binary digital information in a pair of code tracks that are printed on a coupon. Means are provided for recovering the track information with a high degree of reliability. It will be apparent that the employment of a di-bit code in itself constitutes a conservative use of the document space inasmuch as two bar spaces are employed to represent a single binary digit. As such, it is calculated to further the reliability of document readout.

The realiability of readout is further enhanced by requiring transitions in both tracks for the generation of clock pulses. Similarly, the "Sure Start" mark which initiates the readout of the encoded information by the generation of a start pulse in clock synchronism, is formed by the bar codes of both tracks so as to add still further to the reliability of the system. It is again pointed out that the obliteration of the "Sure Start" mark in both tracks will not preclude the initiation of clock pulses. Clock pulses are then initiated by means of the "Self Start" pulses which are derived in clock synchronism provided the proper set of conditions occurs. Once started, the "One Track Run" pulses will permit clock pulses to be derived even if one of the information tracks is completely obliterated. The required conditions for such operation are, of course, more stringent than those necessary for the normal derivation of clock pulses. When it is further considered that each clock pulse generated is slaved to the one preceding it to discriminate against extraneous document marks, it will be clear that a high degree of reliability is attained in the circuit which constitutes the present invention. This holds true even though substitute clock pulses are generated in the absence of track-derived clock pulses. In the present invention, moreover, phase errors are detected to prevent the readout of transitions which are not representative of a stored di-bit. Additionally, the presence of erroneously read di-bits is indicated simultaneously with the readout of the di-bit itself.

Various changes may obviously be made in the parameters employed, the pulse widths recited, the delay intervals used, the maximum duration of the time interval during which no clock pulses are derived from the tracks, etc. Nor is the invention confined to the specific information format of a pair of tracks. In a broader sense the invention is not limited to the specific embodiment disclosed herein, but is applicable to different kinds of storage media. A versatile, reliable data readout system is thus provided which, because it is relatively simple in construction and operation, presents obvious, heretofore unattainable advantages.

From the foregoing disclosure of the invention it will be apparent that numerous modifications and departures may now occur to those skilled in the art, all of which fall within the scope contemplated by the invention.

What is claimed is:

1. Apparatus for reading out complementary pairs of input pulses representing binary digital information printed in di-bit bar code on a coupon and employing timing pulses generated directly from said input pulses in clock synchronism at bit period intervals, comprising means responsive to transitions in said di-bit code for deriving said input pulses, a junction point, means for coupling externally generated pulses to said junction point to initiate said timing pulses in clock synchronism, a delay circuit coupled to said junction point responsive to said timing pulses to provide output pulses of extended duration delayed by an integral number of bit periods; means for gating said last-recited output pulses with said input pulses to generate said timing pulses; and means for detecting absence of any of said timing pulses and responsively substituting a prescribed number of clock pulses therefor; said last-named means including counting means.

2. Apparatus for reading out complementary pairs of input pulses representing binary digital information printed in di-bit bar code on a coupon and employing timing pulses generated directly from said input pulses in clock synchronism at bit period intervals, comprising means responsive to transitions in said di-bit code for deriving said input pulses, a junction point, means for buffering externally generated pulses to said junction point to initiate said timing pulses in clock synchronism, a delay circuit coupled to said junction point responsive to said timing pulses to provide output pulses of extended duration one bit period later; means for gating said last-recited output pulses with said input pulses to generate said timing pulses; and means for detecting absence of any of said timing pulses and responsively substituting a prescribed number of clock pulses therefor.

3. The apparatus of claim 2 and further including a clock pulse terminal, buffering means, a second delay circuit connected between said junction point and said last-recited buffering means, said second delay circuit being responsive to said timing pulses to provide clock pulses one-half bit period wide and one bit period later, a control flip-flop connected to be reset from the output of said second delay circuit and adapted to provide a control signal, a multivibrator connected between said junction point and the set input of said control flip-flop and being adapted to provide an output pulse approximately 1½ bit periods after the occurrence of each timing pulse, a counter adapted to provide a true output signal until a predetermined count is reached, a third delay means connected to said clock pulse terminal and adapted to delay said clock pulses by one bit period, means for gating together the output signals of said third delay means and of said counter to derive a responsive signal, means for gating said last-recited signal with said control signal, means for connecting the output of said last-recited gating means to said last-recited buffering means and to the input of said counter respectively, and means for gating said input signal with said clock pulses and said control signal to couple a responsive signal to said first-recited delay means.

4. The apparatus of claim 2 wherein said information appears in a pair of tracks on said coupon, successive di-bits being positioned adjacent each other in each track, each di-bit consisting of a pair of bars of opposite kind separated by one of said transitions, said means for deriving input pulses comprising means for scanning said tracks adapted to provide representative track signals, a pair of multivibrators associated with each track each responsive to the positive or negative polarity of the scanned transition to provide a corresponding information pulse, means associated with each track for buffering the output signals of each of said pair of multivibrators to a further multivibrator adapted to provide an output pulse of predetermined duration, means for gating together said last-recited output pulses derived from different tracks, and an additional multivibrator connected to said last-recited gating means adapted to provide said input pulses at its output.

5. The apparatus of claim 4 wherein said information tracks further include code marks uniquely recognizable to derive start and stop readout signals respectively, first and second flip-flops, means for applying said start and stop signals to the set and reset input respectively of said first flip-flop, the output of said first flip-flop being connected to the reset input of said second flip-flop, means responsive to the leading edge of each coupon for deriving a coupon-present pulse, a multivibrator responsive to the trailing edge of said coupon-present pulse to apply a responsive pulse to the set input of said second flip-flop, means for gating the output signal of said second flip-flop with said coupon-present pulse, and a pulse counter coupled to the output of said last-recited gating means and adapted to provide an error interlock signal at its output when a predetermined count is reached.

6. The apparatus of claim 4 wherein said tracks further include a uniquely recognizable sure start mark comprising four bars of one kind in one track and four bars of the opposite kind in the other track, means for providing said externally generated pulses comprising a flip-flop, means for gating positive information pulses derived from one of said tracks with negative information pulses derived from the other track to the set input of said flip-flop, means for buffering negative information pulses from said one track and positive information pulses from said other track to the reset input of said flip-flop, means coupled to the output of said flip-flop responsive to the absence of pulses for approximately 2½ bit periods to provide a first pulse, means connected to receive all information pulses from both of said tracks adapted to provide responsive second pulses wider than the corresponding information pulses and delayed therefrom by two bit periods, and means for gating together said first, second and input pulses to derive sure start pulses in clock synchronism.

7. The apparatus of claim 4 and further including a clock pulse terminal, a second delay circuit coupled between said junction point and said clock pulse terminal, said second delay circuit being responsive to each timing pulse appearing at said junction point to apply a clock pulse half a bit period wide to said block pulse terminal and delayed by one bit period, means for deriving timing pulses from a single track comprising a delay circuit having a pair of outputs, means for buffering all information pulses to said last-recited delay circuit, said delay circuit being responsive to each applied information pulse to provide a first pulse at one of said pair of outputs wider than said information pulse and being further adapted to provide a second pulse at the other of its outputs delayed by two bit periods, means for gating said first pulse with said clock pulses to derive third pulses, first and second pulse absence detectors each adapted to provide an output pulse upon the failure to receive an input pulse for approximately three-fourths bit periods, means for buffering all information pulses derived from one of said tracks to said first detector, means for buffering all information pulses derived from the other track to said second detector, a multivibrator, means for buffering the output pulses from said first and second detectors to said multivibrator to derive responsive fourth pulses wider than said last-recited output pulses, and gating means having its output coupled to said junction point, said last-recited gating means being responsive to said second, third and fourth pulses to provide one-track pulses at its output.

8. The apparatus of claim 4 and further including means for providing said externally generated pulses comprising first and second pulse absence detectors each adapted to provide an output pulse upon the failure to receive a pulse at its input for approximately three-fourths bit periods, means for buffering all information pulses derived from one of said tracks to said first detector, means for buffering all information pulses derived from the other track to said second detector, a multivibrator, means for buffering the output pulses from said first and second detectors to said multivibrator to derive responsive first pulses wider than said output pulses, means connected to receive all information pulses from both of said tracks to provide a responsive second pulse for each information pulse wider than the latter and delayed therefrom by two bit periods, and means for gating together said first, second and input pulses to derive self start pulses in clock synchronism.

9. The apparatus of claim 8 and further comprising a clock pulse terminal, a second delay circuit coupled between said junction point and said clock pulse terminal, said second delay circuit being responsive to said timing pulses to provide clock pulses one-half bit period wide and one bit period later, means for inverting said clock pulses, means for monitoring phase errors comprising a flip-flop circuit adapted to provide a phase error signal at its output, means connected to the set input of said last-recited flip-flop for gating said self start signals with said clock pulses, and means connected to the reset input of said last-recited flip-flop circuit for gating said self start pulses with said inverted clock pulses.

10. The apparatus of claim 4 and further including a clock pulse terminal, a second delay circuit coupled between said junction point and said clock pulse terminal, said second delay circuit being responsive to said timing pulses to provide clock pulses one-half bit period wide and one bit period later, means for inverting said clock pulses, a decoding circuit corresponding to each track comprising a flip-flop circuit, means connected to the set input of said flip-flop circuit for gating said positive information pulses with said clock pulses, means connected to the reset input of said flip-flop circuit for gating said negative information pulses with said clock pulses, and means for gating the output signal of said flip-flop circuit with said inverted clock pulses to derive a decoded output signal for the associated track.

11. The apparatus of claim 10 and further including means associated with each of said tracks for monitoring binary digit errors each comprising second and third flip-flop circuits, a first multivibrator responsive to said inverted clock pulses for deriving relatively narrow first pulses, a second multivibrator responsive to the trailing edge of said first pulses for deriving second pulses, means for gating said positive and negative information pulses respectively derived from the associated track with said clock pulses for application to the set input of said second flip-flop circuit, means for resetting said second flip-flop circuit with said second pulses, means for gating the output signal of said second flip-flop circuit with said first pulses for application to the set input of said third flip-flop circuit, means for resetting said third flip-flop circuit with said clock pulses, said third flip-flop circuit being adapted to provide an error signal at its output for each erroneous binary digit simultaneously with the appearance of the decoded output signal representative of said digit.

12. Apparatus for reading complementary pairs of input pulses representing binary digital information out of a storage medium employing timing pulses generated directly from said input pulses in clock synchronism at binary digit intervals, comprising means responsive to transitions in said storage medium for deriving said input pulses, means for initiating said timing pulses in clock synchronism, delay means responsive to said timing pulses for providing responsive output pulses of extended duration one binary digit interval later; means responsive to the joint occurrence of an input pulse with one of said responsive output pulses to generate the next timing pulse; and means for detecting absence of any of said timing pulses and responsively substituting a prescribed number of clock pulses therefor.

13. Apparatus for reading complementary pairs of input pulses representing binary digital information out of a storage medium with timing pulses generated directly from said input pulses in clock synchronism at binary digit intervals, comprising means responsive to transitions in said storage medium for deriving said input pulses, means for initiating said timing pulses in clock synchronism, means responsive to said timing pulses for providing output pulses delayed an integral number of bit intervals; means responsive to the joint occurrence of an input pulse with an output pulse to generate the next timing pulse; and means for detecting absence of any of said timing pulses and responsively substituting a prescribed number of clock pulses therefor.

14. The apparatus of claim 13 and further including a clock pulse terminal adapted to provide clock pulses, second and third delay means connected in series by way of said clock pulse terminal and adapted to delay said timing and clock pulses respectively by one binary digit interval, means responsive to the absence of timing pulses for approximately 1½ binary digit intervals to provide a control signal, and means responsive to the presence of said control signal concurrently with a pulse derived from said third delay means to apply a substitute clock pulse to said clock pulse terminal.

15. The apparatus of claim 14 wherein said pulse absence responsive means comprises a one-shot multivibrator connected to receive said timing pulses and being adapted to provide responsive output pulses having a duration of approximately 1½ binary digit intervals, said multivibrator being connected to set said bistable circuit.

16. The apparatus of claim 14 and further including means responsive to the joint occurrence of said control signal, an input pulse and a clock pulse to apply a responsive pulse to said first-recited delay means.

17. The apparatus of claim 16 and further including means responsive to the occurrence of a predetermined number of said substitute clock pulses to inhibit the further generation of said last-recited pulses.

18. The apparatus of claim 17 wherein said last-recited means comprises means for counting said substitute clock pulses, said counting means being adapted to provide a true output signal until said predetermined number is reached, and means for transmitting the output pulses of said third delay means only in the presence of said true output signal.

19. The apparatus of claim 13 wherein said storage medium carries said information in di-bit code in a pair of tracks, each di-bit consisting of a pair of opposite indicia separated by one of said transitions, said means for deriving input pulses including means for scanning said tracks adapted to provide representative track signals, means associated with each of said tracks for deriving separate information pulses for positive and negative transitions respectively, and means responsive to the occurrence within a predetermined time bracket of information pulses derived from both of said tracks to produce one of said input pulses.

20. The apparatus of claim 19 wherein said storage medium consists of a document in the nature of a coupon having said information tracks imprinted thereon, means responsive to the leading edge of said coupon for deriving a coupon-present pulse, and means for deriving a coupon-read bracket signal from said last-recited pulse, said last-recited signal being adapted to terminate the readout of said coupon a predetermined time interval after the arrival of said leading edge.

21. The apparatus of claim 19 wherein said medium consists of a document in the nature of a coupon having said information tracks imprinted thereon, said tracks further including code marks uniquely recognizable to derive start and stop readout signals respectively, a first bistable means adapted to be set and reset respectively by said start and stop readout signals to provide a corresponding true coupon-read signal, means responsive to the leading edge of said coupon for deriving a coupon-present pulse, second bistable means adapted to be set in response to said coupon-present pulses and to be reset by said true coupon-read pulses, pulse counting means, and means responsive to the joint occurrence of a coupon-present pulse and a signal derived from the output of said second bistable means to actuate said pulse counting means, said last-recited means being adapted to provide an error interlock signal when a predetermined count is reached.

22. The apparatus of claim 19 wherein said tracks further include a uniquely recognizable sure start mark, said sure start mark comprising said indicia extended without interruption for the length of two di-bits, said means for initiating said timing pulses including a bistable circuit, means responsive to the joint presence of a positive information pulse from one of said tracks and a negative information pulse from the other one of said tracks to set said last-recited bistable circuit, means responsive to the presence of a negative information pulse from said one track or a positive information pulse from said other track to reset said last-recited bistable circuit, means coupled to the output of said last-recited bistable circuit and responsive to the absence of pulses for approximately 2½ binary digit intervals to provide a first pulse, means responsive to each of said information pulses for providing a second pulse delayed by two binary digit intervals, and means responsive to the joint occurrence of said first, second and input pulses respectively to derive sure start pulses in clock synchronism.

23. The apparatus of claim 19 wherein said timing pulses are applied to a junction point, and further including a clock pulse terminal, delay means responsive to each timing pulse appearing at said junction point to apply a clock pulse to said clock pulse terminal delayed by one binary digit interval, means for deriving clock pulses from a single track comprising a delay circuit having a pair of outputs, means responsive to positive and negative transitions in either track to apply information pulses to said last-recited delay circuit, said delay circuit being responsive to each applied information pulse to extend its duration to provide a first pulse at one of said pair of outputs, and being further adapted to provide a second pulse delayed by two binary digit intervals at the other one of its output, means responsive to the joint occurrence of a clock pulse and said first pulse to derive a third pulse, first and second means each connected to receive all input pulses from a different track and each adapted to provide a responsive pulse at its output upon the failure to receive pulses at its input for approximately three-fourths of a binary digit interval, means for buffering together said last-recited responsive pulses, means for extending the duration of each output pulse of said buffering means to provide a fourth pulse, and means responsive to the joint occurrence of said second, third and fourth pulses to couple a responsive one-track pulse to said junction point.

24. The apparatus of claim 19 wherein said means for initiating said timing pulses includes first and second means each connected to receive all information pulses from a different track and each adapted to provide a responsive pulse at its output upon the failure to receive pulses at its input for approximately three-fourths of a binary digit interval, means for buffering together said last-recited responsive pulses, means for extending the duration of each output pulse of said buffering means to provide a first pulse, means responsive to each information pulse in both of said tracks for providing a second pulse delayed by two binary digit intervals, and means responsive to the joint occurrence of said first pulses, second pulses, and input pulses respectively to derive self start pulses in clock synchronism.

25. The apparatus of claim 24 and further including a clock pulse terminal, delay means responsive to each timing pulse appearing at said junction point to apply a clock pulse to said clock pulse terminal delayed by one binary digit interval and having a duration of one-half of said interval, means for inverting said clock pulses, means for monitoring phase errors comprising bistable means adapted to provide a phase error signal at its output, and means responsive to the joint occurrence of each of said self start pulses with said clock pulses and said inverted clock pulses respectively to set and reset said last-recited bistable means.

26. The apparatus of claim 19 and further including means responsive to said timing pulses for deriving clock pulses having a duration of one-half binary digit interval, a decoding circuit corresponding to each track comprising a bistable circuit, means responsive to the presence of positive and negative information pulses respectively concurrently with a clock pulse to set and reset respectively said last-recited bistable circuit, means for inverting said clock pulses, and means for gating the output signal of said last-recited bistable circuit with said inverted clock pulses to derive a decoded output signal.

27. The apparatus of claim 26 wherein said medium consists of a document in the nature of a coupon having said information tracks imprinted thereon, said tracks further including code marks uniquely recognizable to derive start and stop readout signals respectively, a first bistable means adapted to be set and reset by said start and stop readout signals respectively to provide a corresponding true coupon-read signal, means responsive to the leading edge of said coupon for deriving a coupon-present pulse, second bistable means adapted to be set in response to said coupon-present pulses and to be reset by said true coupon-read pulses, means responsive to the joint occurrence of signals derived from said coupon-present pulses and from the output of said second bistable means to derive a false coupon-read signal, means for buffering together said true and false coupon-read signals to derive a combined coupon-read signal, and means for transmitting said inverted clock pulses only in the presence of said true coupon-read signal.

28. The apparatus of claim 26 and further including means associated with each of said tracks for monitoring binary digit errors, each of said last-recited means comprising first and second bistable circuits, means responsive to said inverted clock pulses for deriving relatively narrow first pulses, means responsive to the trailing edge of said first pulses for deriving second pulses, means responsive to the joint occurrence of clock pulses and positive or negative information pulses derived from the associated track to set said first bistable circuit, and to reset it with said second pulses, means responsive to the joint occurrence of the reset output signal of said first bistable circuit and said first pulses to set said second bistable circuit and to reset it with said clock pulses, said last-recited circuit being adapted to provide an error signal at its output for each erroneous binary digit simultaneously with the appearance of the decoded output signal representative of said digit.

29. Apparatus for reading out a storage medium wherein relevant information is stored in a di-bit code, comprising means responsive to the occurrence of transitions in said code to provide corresponding input pulses, a junction point and a clock terminal, first, second and third delay means each responsive to an input pulse to provide a corresponding output pulse one bit period later, said bit period being the time interval required to scan a di-bit, means responsive to the joint occurrence of one of said input pulses and an output pulse from said first delay means to apply a pulse to said junction point, said second delay means being connected to couple said last-recited pulse from said junction point to said clock pulse terminal, a bistable circuit connected to be reset from the output of said second delay means, means responsive to the nonrecurrence of pulses at said junction point at approximately one-bit intervals, said third delay means having its input coupled to said clock pulse terminal, counting means adapted to change its normal output signal level when a predetermined count of pulses applied to its input is reached, means responsive to the joint occurrence of said normal output signal and a pulse from said third delay means to provide a corresponding output pulse, means adapted upon the joint occurrence of said last-recited pulse and the output signal of said bistable circuit, when the latter is in its set state, to couple a pulse to said clock pulse terminal and to the input of said counting means, and means responsive to the joint occurrence of said bistable circuit output signal, an input pulse and a pulse at said clock pulse terminal to couple a pulse to said first delay means.

30. A document reader for a document wherein relevant information is printed in di-bit bar code in a pair of code tracks, comprising means for scanning said tracks adapted to derive a representative track signal for each track, means for deriving pulses from each of said track signals corresponding to positive and negative transitions in said tracks, first gating means responsive to the joint occurrence of said pulses derived from both of said tracks to provide a first signal at the output thereof, first, second and third delay means each responsive to signals applied to the input thereof to provide an output signal one bit period later, said bit period corresponding to the time for scanning a di-bit in said tracks, a junction point coupled to the input of each of said delay means, second gating means responsive to the joint occurrence of said first signal and the output signal of said first delay means to provide a corresponding signal at its output, said second delay means having its input coupled to said junction point and its output coupled to a clock pulse terminal, a control flip-flop connected to be reset from the output of said second delay means, a detector responsive to the absence of pulses at said junction point at intervals of at least one bit period to set said control flip-flop, third gating means having its input coupled to the output of said control flip-flop and to a normally conductive fourth gating means respectively, the output of said third gating means being coupled to said clock pulse terminal, said third delay means being coupled between said clock pulse terminal and the input of said fourth gating means, a counter responsive to the occurrence of a predetermined number of pulses at the output of said third gating means to render said fourth gating means non-conductive, and fifth gating means connected to apply a pulse to said first delay means upon the joint occurrence of signals at said clock pulse terminal, at the output of said first gating means and at the output of said control flip-flop respectively.

No references cited.

MAYNARD R. WILBUR, *Primary Examiner.*

A. L. NEWMAN, *Assistant Examiner.*